(12) United States Patent
Tanaka

(10) Patent No.: US 12,269,465 B2
(45) Date of Patent: Apr. 8, 2025

(54) VEHICLE CONTROL APPARATUS

(71) Applicant: TOYOTA JIDOSHA KABUSHIKI KAISHA, Toyota (JP)

(72) Inventor: Yusuke Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 17/881,814

(22) Filed: Aug. 5, 2022

(65) Prior Publication Data

US 2023/0059815 A1 Feb. 23, 2023

(30) Foreign Application Priority Data

Aug. 18, 2021 (JP) ................................ 2021-133383

(51) Int. Cl.
  *B60W 30/08* (2012.01)
  *B60Q 1/52* (2006.01)
  *B60W 30/09* (2012.01)

(52) U.S. Cl.
  CPC ............. *B60W 30/08* (2013.01); *B60Q 1/52* (2013.01); *B60W 30/09* (2013.01); *B60W 2540/26* (2013.01); *B60W 2720/106* (2013.01)

(58) Field of Classification Search
  None
  See application file for complete search history.

(56) References Cited

U.S. PATENT DOCUMENTS

| | | | | |
|---|---|---|---|---|
| 8,655,546 | B2* | 2/2014 | Natori | G08G 1/166 701/70 |
| 2011/0241862 | A1* | 10/2011 | Debouk | B60W 60/0018 340/439 |
| 2012/0078466 | A1* | 3/2012 | Natori | G08G 1/166 701/36 |
| 2017/0120887 | A1* | 5/2017 | Kurahashi | B60W 50/082 |
| 2018/0037230 | A1* | 2/2018 | Otake | B60K 28/06 |
| 2019/0367049 | A1* | 12/2019 | Oba | B60W 50/082 |
| 2020/0283021 | A1* | 9/2020 | Horii | B60W 30/18109 |
| 2021/0331619 | A1* | 10/2021 | Cobb | B60Q 1/38 |
| 2023/0137063 | A1* | 5/2023 | Tsuda | B60K 28/06 701/1 |

FOREIGN PATENT DOCUMENTS

| | | | |
|---|---|---|---|
| JP | 2016-085563 A | 5/2016 | |
| KR | 20170126357 A | * 11/2017 | ............ B60Q 1/44 |

* cited by examiner

*Primary Examiner* — Amelia Vorce
(74) *Attorney, Agent, or Firm* — Sughrue Mion, PLLC

(57) ABSTRACT

A vehicle control apparatus starts driving trouble tackling control designed to decelerate and stop an own vehicle when it is determined that a driver is in a driving trouble state where the driver has trouble driving the own vehicle, then start a deceleration process at a predetermined timing as a process of driving trouble tackling control, and then start a hazard lighting process at a predetermined timing as another process of driving trouble tackling control. The vehicle control apparatus stops driving trouble tackling control when a hazard switch is operated during the performance of the hazard lighting process, and starts the hazard lighting process without stopping the driving trouble tackling control when the hazard switch is operated between a timing when it is determined that the driver is in the driving trouble state and a timing when the hazard lighting process is started.

6 Claims, 16 Drawing Sheets

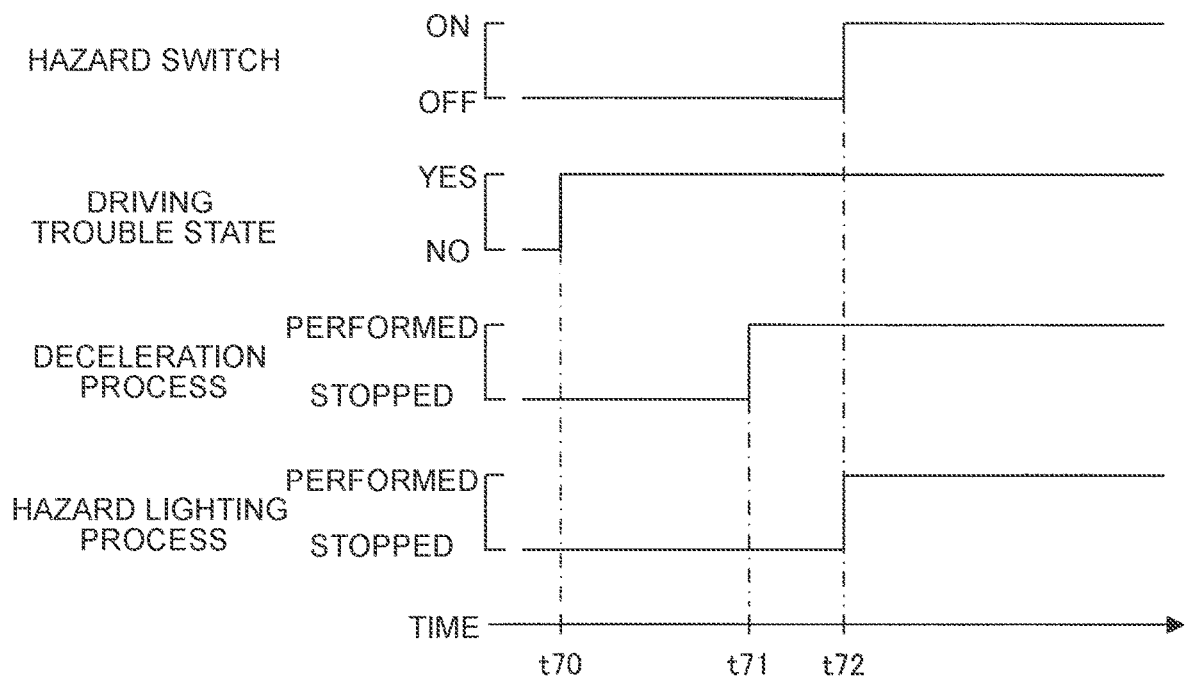
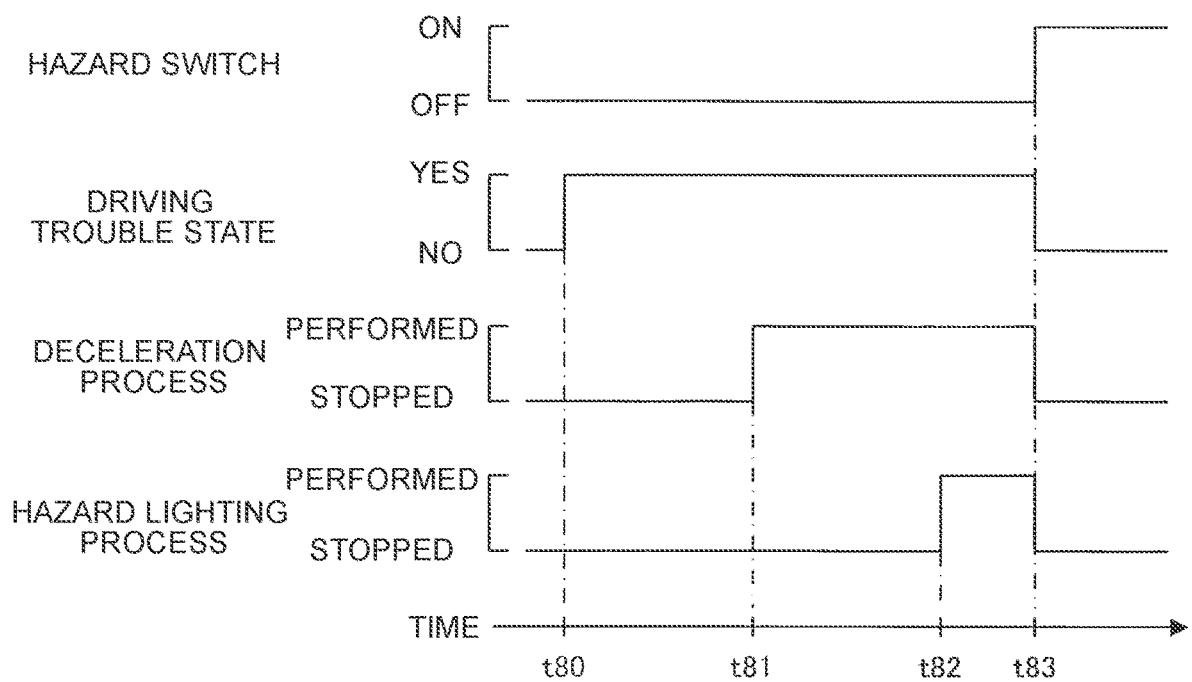

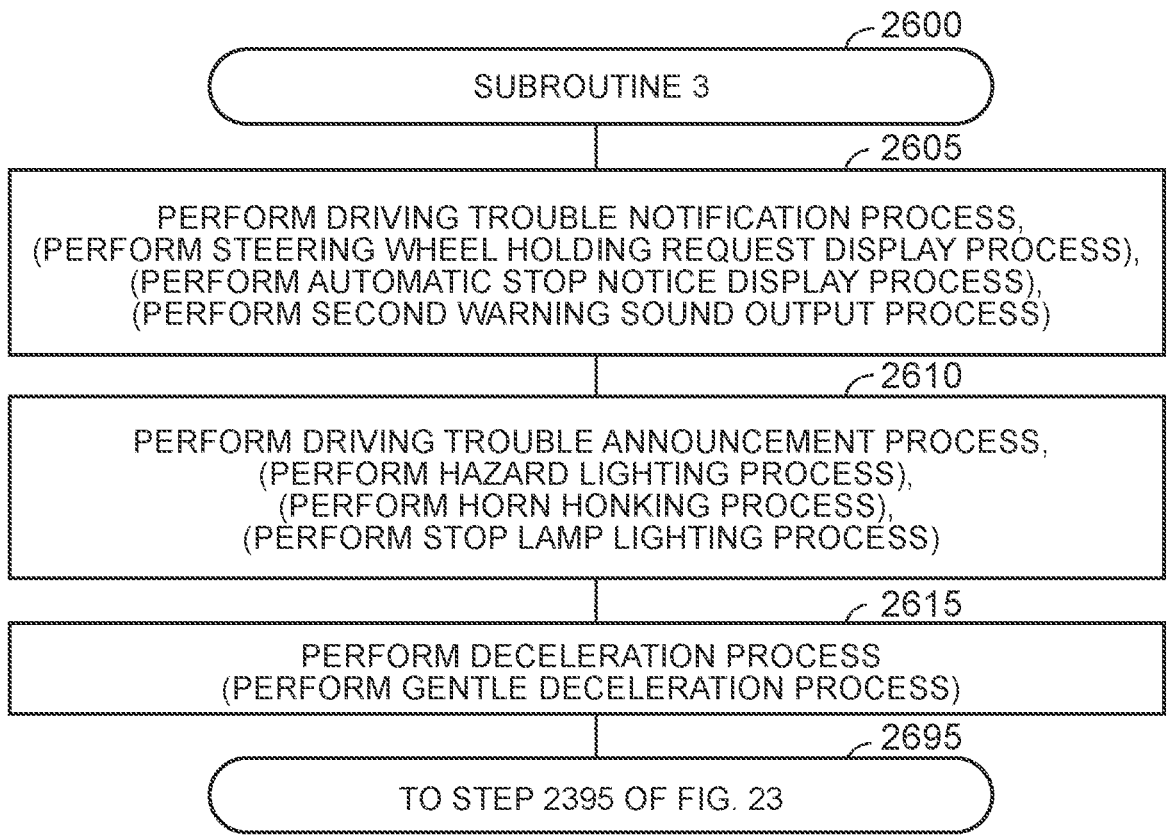
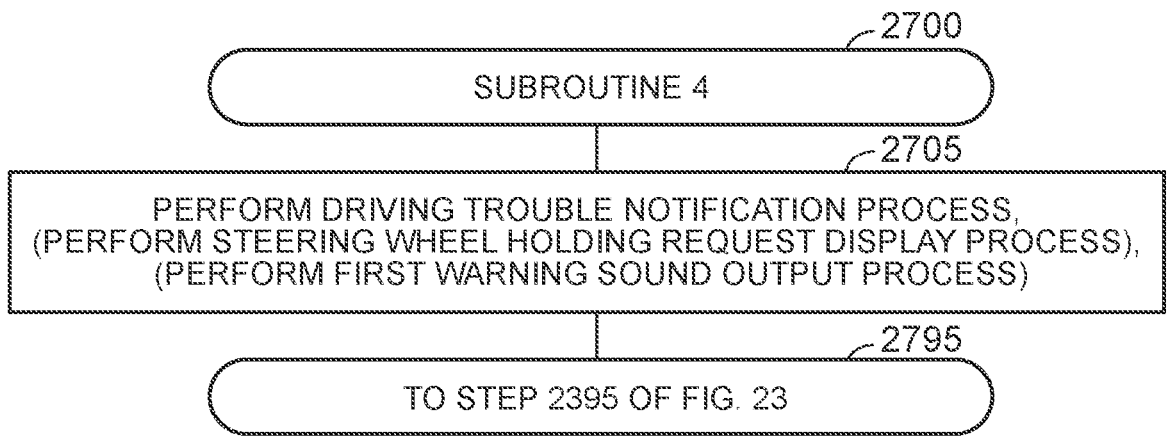

VEHICLE CONTROL APPARATUS

CROSS-REFERENCE TO RELATED APPLICATION

This application claims priority to Japanese Patent Application No. 2021-133383 filed on Aug. 18, 2021, incorporated herein by reference in its entirety.

BACKGROUND

1. Technical Field

The disclosure is related to a vehicle control apparatus.

2. Description of Related Art

There is known a vehicle control apparatus that performs driving trouble tackling control (dead man control) for issuing a warning to the interior and exterior of an own vehicle, decelerating the own vehicle, and eventually stopping the own vehicle in the case where a driver of the own vehicle falls into a driving trouble state (a state where the driver has trouble driving the own vehicle due to unconsciousness or the like) when driving the own vehicle. Thus, the own vehicle is safely stopped when the driver falls into the driving trouble state. Besides, there is also known a vehicle control apparatus that carries out so-called hazard lighting to blink direction indicators of the own vehicle, as the warning to the exterior of the own vehicle when the driver of the own vehicle falls into the driving trouble state (e.g., see Japanese Unexamined Patent Application Publication No. 2016-85563 (JP 2016-85563 A)).

SUMMARY

In general, the own vehicle is provided with a switch (a hazard switch) that is operated to carry out hazard lighting. If the hazard switch is operated when hazard lighting is not carried out, hazard lighting is started. If the hazard switch is operated when hazard lighting is carried out, hazard lighting is stopped.

In this manner, the hazard switch is operated to carry out and stop hazard lighting. However, the driver or a passenger of the own vehicle may operate the hazard switch in an attempt to stop driving trouble tackling control that has been started in response to a determination that the driver of the own vehicle has fallen into the driving trouble state. Thus, there are moves to structure a system in such a manner as to stop driving trouble tackling control when the hazard switch is operated. In the case where the system is thus structured, driving trouble tackling control is stopped when the hazard switch is operated after the start of driving trouble tackling control.

On the other hand, however, the passenger (or the driver himself or herself in some cases) of the own vehicle who has noticed that driving trouble tackling control has been started in response to the falling of the driver of the own vehicle into the driving trouble state may operate the hazard switch in an attempt to announce the start of driving trouble tackling control in response to the falling of the driver of the own vehicle into the driving trouble state to those around the own vehicle, by carrying out hazard lighting. At this time, the passenger or the like of the own vehicle who has operated the hazard switch has no intention of stopping driving trouble tackling control. In this case, it is not preferable to stop driving trouble tackling control just because the hazard switch has been operated.

It is an object of the disclosure to provide a vehicle control apparatus that can perform or stop driving trouble tackling control in accordance with the intention of a passenger or the like of an own vehicle who has operated a hazard switch.

A vehicle control apparatus according to the disclosure is configured to start driving trouble tackling control designed to decelerate and stop an own vehicle when it is determined that a driver of the own vehicle is in a driving trouble state where the driver has trouble driving the own vehicle, then start a deceleration process designed to decelerate the own vehicle at a predetermined timing as a process of the driving trouble tackling control, and then start a hazard lighting process designed to carry out hazard lighting at a predetermined timing as another process of the driving trouble tackling control. Moreover, the vehicle control apparatus according to the disclosure is configured to stop the driving trouble tackling control when a hazard switch that is operated to request the start and stop of the hazard lighting is operated during the performance of the hazard lighting process, and start the hazard lighting process without stopping the driving trouble tackling control when the hazard switch is operated between a timing when it is determined that the driver is in the driving trouble state and a timing when the hazard lighting process is started.

The driver or the passenger of the own vehicle may operate the hazard switch in an attempt to stop driving trouble tackling control that has been started in response to a determination that the driver of the own vehicle has fallen into the driving trouble state. Thus, there are moves to structure a system in such a manner as to stop driving trouble tackling control when the hazard switch is operated. In the case where the system is thus structured, driving trouble tackling control is stopped when the hazard switch is operated after the start of driving trouble tackling control.

On the other hand, however, the passenger (or the driver himself or herself in some cases) of the own vehicle who has noticed that driving trouble tackling control has been started in response to the falling of the driver of the own vehicle into the driving trouble state may operate the hazard switch in an attempt to announce the start of driving trouble tackling control in response to the falling of the driver of the own vehicle into the driving trouble state to those around the own vehicle, by carrying out hazard lighting. At this time, the passenger or the like of the own vehicle who has operated the hazard switch has no intention of stopping driving trouble tackling control. In this case, it is not preferable to stop driving trouble tackling control just because the hazard switch has been operated.

According to the disclosure, driving trouble tackling control is stopped when the hazard switch is operated during the performance of the hazard lighting process. Therefore, in a scene in which the passenger or the like of the own vehicle is estimated to have operated the hazard switch with the intention of stopping driving trouble tackling control, driving trouble tackling control is stopped. Therefore, a measure matching the original intention of the passenger or the like of the own vehicle is taken.

On the other hand, according to the disclosure, when the hazard switch is operated between the timing when it is determined that the driver is in the driving trouble state and the timing when the hazard lighting process is started, the hazard lighting process is started without stopping driving trouble tackling control. Therefore, in a scene in which the passenger or the like of the own vehicle is estimated to have operated the hazard switch with the intention of announcing the start of driving trouble tackling control to those around the own vehicle, the hazard lighting process is started without stopping driving trouble tackling control. Therefore, a measure matching the original intention of the passenger or the like of the own vehicle is taken.

In this manner, according to the disclosure, driving trouble tackling control can be performed or stopped in accordance with the intention of the passenger or the like of the own vehicle who has operated the hazard switch.

Besides, a vehicle control apparatus according to the disclosure is configured to start driving trouble tackling control designed to decelerate and stop an own vehicle when it is determined that a driver of the own vehicle is in a driving trouble state where the driver has trouble driving the own vehicle, and then start a deceleration process designed to decelerate the own vehicle and a hazard lighting process designed to carry out hazard lighting at a predetermined timing as processes of the driving trouble tackling control. Moreover, the vehicle control apparatus according to the disclosure is configured to stop the driving trouble tackling control when a hazard switch that is operated to request the start and stop of the hazard lighting is operated during the performance of the hazard lighting process, and start the hazard lighting process without stopping the driving trouble tackling control when the hazard switch is operated between a timing when it is determined that the driver is in the driving trouble state and a timing when the hazard lighting process is started.

As described previously, when the passenger or the like of the own vehicle who has operated the hazard switch has no intention of stopping driving trouble tackling control, it is not preferable to stop driving trouble tackling control just because the hazard switch has been operated.

According to the disclosure, driving trouble tackling control is stopped when the hazard switch is operated during the performance of the hazard lighting process. Therefore, in a scene in which the passenger or the like of the own vehicle is estimated to have operated the hazard switch with the intention of stopping driving trouble tackling control, driving trouble tackling control is stopped. Therefore, a measure matching the original intention of the passenger or the like of the own vehicle is taken.

On the other hand, according to the disclosure, when the hazard switch is operated between the timing when it is determined that the driver is in the driving trouble state and the timing when the hazard lighting process is started, the hazard lighting process is started without stopping driving trouble tackling control. Therefore, in a scene in which the passenger or the like of the own vehicle is estimated to have operated the hazard switch with the intention of announcing the start of driving trouble tackling control to those around the own vehicle, the hazard lighting process is started without stopping driving trouble tackling control. Therefore, a measure matching the original intention of the passenger or the like of the own vehicle is taken.

In this manner, according to the disclosure, driving trouble tackling control can be performed or stopped in accordance with the intention of the passenger or the like of the own vehicle who has operated the hazard switch.

Incidentally, as one aspect of the disclosure, the vehicle control apparatus according to the disclosure may be configured to start the deceleration process after starting the hazard lighting process, after the start of the driving trouble tackling control.

According to the disclosure, even when the deceleration process is started after the start of the hazard lighting process, driving trouble tackling control can be performed or stopped in accordance with the intention of the passenger or the like of the own vehicle who has operated the hazard switch.

Besides, as another aspect of the disclosure, the vehicle control apparatus according to the disclosure may be configured to start the deceleration process and the hazard lighting process simultaneously, after the start of the driving trouble tackling control.

According to the disclosure, even in the case where the deceleration process and the hazard lighting process are started simultaneously, driving trouble tackling control can be performed or stopped in accordance with the intention of the passenger or the like of the own vehicle who has operated the hazard switch.

Besides, as still another aspect of the disclosure, the vehicle control apparatus may be configured to stop the driving trouble tackling control when the hazard switch is operated between the timing when it is determined that the driver is in the driving trouble state and the timing when the hazard lighting process is started and the hazard switch is operated after the hazard lighting process is started.

According to the disclosure, even after the hazard lighting process is started in response to the operation of the hazard switch before the start of the hazard lighting process, driving trouble tackling control can be performed or stopped in accordance with the intention of the passenger or the like of the own vehicle who has operated the hazard switch.

The components of the disclosure are not limited to those of the embodiments of the disclosure that will be described later with reference to the drawings. Other objects, other features, and concomitant advantages of the disclosure will be easily understood from the description of the embodiments of the disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a time chart showing performance states of deceleration control and the hazard lighting process in the case where the hazard switch is operated before the start of the hazard lighting process at a predetermined timing after deceleration control is started at a predetermined timing, in the embodiment shown in FIG. 5;

FIG. 8 is a time chart showing performance states of deceleration control and the hazard lighting process in the case where the hazard switch is operated after the start of deceleration control and the hazard lighting process at predetermined timings, in the embodiment shown in FIG. 5;

FIG. 26 is a flowchart showing still another routine that is executed by the vehicle control apparatus according to the embodiment of the disclosure; and FIG. 27 is a flowchart showing still another routine that is executed by the vehicle control apparatus according to the embodiment of the disclosure.

DETAILED DESCRIPTION OF EMBODIMENTS

Figure 1:
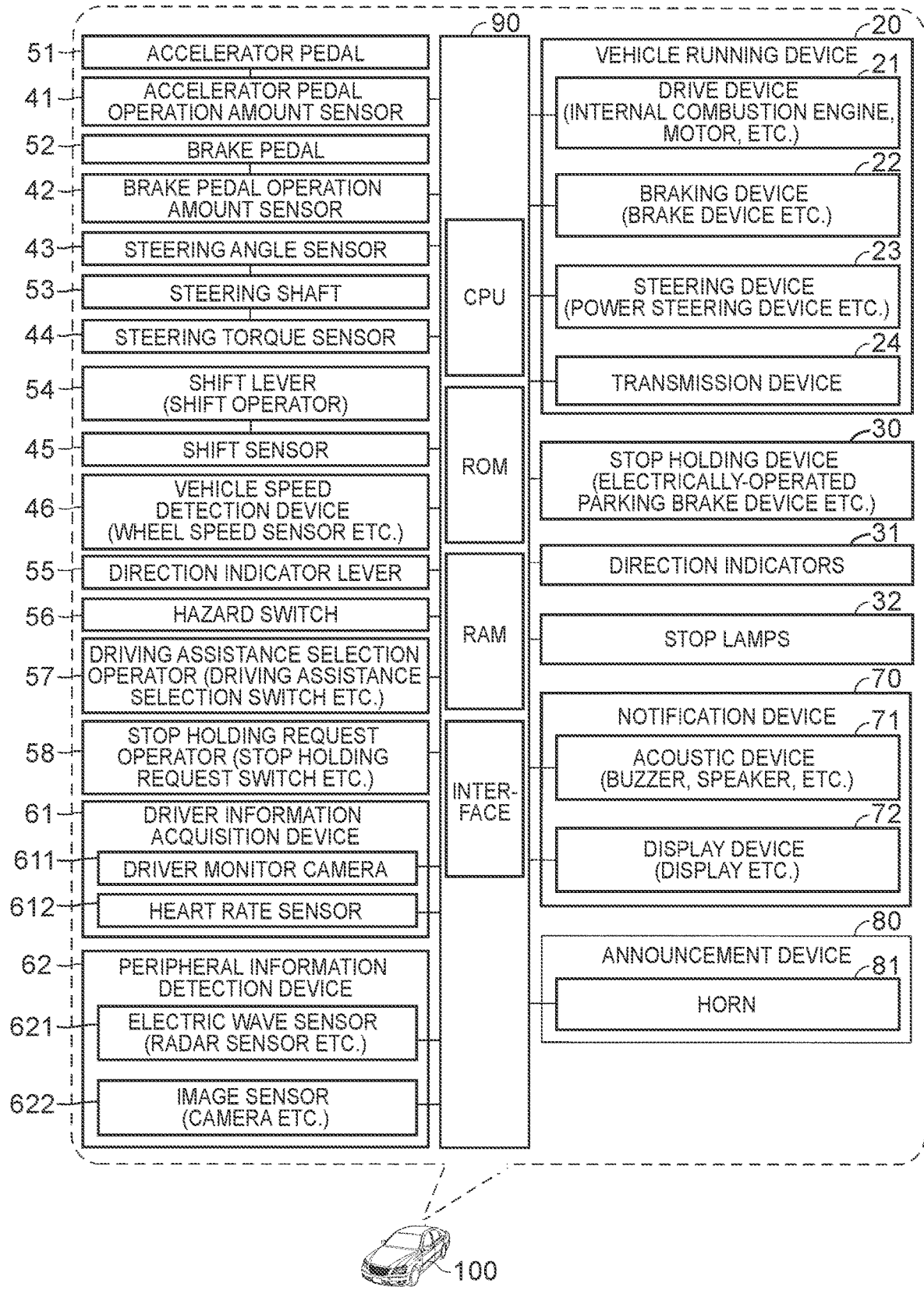
FIG. 1 is a view showing a vehicle control apparatus according to one of the embodiments of the disclosure and a vehicle (own vehicle) mounted with the vehicle control apparatus.

A vehicle control apparatus according to one of the embodiments of the disclosure will be described hereinafter with reference to the drawings. As shown in FIG. 1, the vehicle control apparatus 10 according to the embodiment of the disclosure is mounted in a vehicle (an own vehicle 100).

The vehicle control apparatus 10 is equipped with an ECU 90. The ECU 90 is equipped with a microcomputer as a main component thereof. The ECU 90 includes a CPU, a ROM, a RAM, a non-volatile memory, an interface, and the like. The CPU realizes various functions by executing instructions (programs and routines) stored in the ROM.

Vehicle Running Device

The own vehicle 100 is mounted with a vehicle running device 20. The vehicle running device 20 is a device that performs the driving, braking, steering, and shifting of the own vehicle 100, and is equipped with a drive device 21, a braking device 22, a steering device 23, and a transmission device 24 in the present example.

Drive Device

The drive device 21 is a device that outputs a driving force applied to the own vehicle 100 to cause the own vehicle 100 to run, and is, for example, an internal combustion engine and/or a motor or the like. The drive device 21 is electrically connected to the ECU 90. The ECU 90 can control the driving force output from the drive device 21, by controlling the behavior of the drive device 21.

Braking Device

The braking device 22 is a device that outputs a braking force applied to the own vehicle 100 to brake the own vehicle 100, and is, for example, a hydraulic brake device. The braking device 22 is electrically connected to the ECU 90. The ECU 90 can control the braking force output from the braking device 22, by controlling the behavior of the braking device 22.

Steering Device

The steering device 23 is a device that outputs a steering force applied to the own vehicle 100 to steer the own vehicle 100, and is, for example, a power steering device. The steering device 23 is electrically connected to the ECU 90. The ECU 90 can control the steering force output from the steering device 23, by controlling the behavior of the steering device 23.

Transmission Device

The transmission device 24 is a device that makes a changeover between the transmission and non-transmission of the driving force output from the drive device 21 to driving wheels of the own vehicle 100, and that makes a changeover between the transmission of the driving force to the driving wheels to move the own vehicle 100 forward and the transmission of the driving force to the driving wheels to move the own vehicle 100 backward. Furthermore, the transmission device 24 is also a device that holds the own vehicle 100 stopped, by locking a certain gear of the transmission device 24 to prevent the gear from rotating, by engaging a pawl-like part (a parking lock pawl) with the gear. Accordingly, the transmission device 24 also functions as a stop holding device that holds the own vehicle 100 stopped.

The transmission device 24 behaves in one of a state (a drive range state SD) where the driving force is transmitted to the driving wheels to move the own vehicle 100 forward, a state (a rear range state SR) where the driving force is transmitted to the driving wheels to move the own vehicle 100 backward, a state (a neutral range state SN) where the driving force is not transmitted to the driving wheels of the own vehicle 100, and a state (a parking range state SP) where the own vehicle 100 is held stopped.

The transmission device 24 is electrically connected to the ECU 90. The ECU 90 can set the transmission device 24 in one of the drive range state SD, the rear range state SR, the neutral range state SN, and the parking range state SP, by controlling the behavior of the transmission device 24.

Stop Holding Device

Besides, the own vehicle 100 is mounted with a stop holding device 30. The stop holding device 30 is a device that holds the own vehicle 100 stopped, and is, for example, an electrically-operated parking brake device. The electrically-operated parking brake device is a device that can apply a braking force to the wheels of the own vehicle 100. In particular, the electrically-operated parking brake device is a device that can apply a braking force to each of the wheels of the own vehicle 100 by pressing a brake pad against a brake disc provided in each of the wheels. The stop holding device 30 is electrically connected to the ECU 90. The ECU 90 can hold the stopped own vehicle 100 stopped or decelerate the running own vehicle 100, by causing the stop holding device 30 to behave actively.

Direction Indicators

Besides, the own vehicle 100 is mounted with direction indicators 31. The direction indicators 31 are devices for informing those outside the own vehicle 100 of a turning direction of the own vehicle 100. The direction indicators 31 are provided in a front-right corner region, a front-left corner region, a rear-right corner region, and a rear-left corner region of the own vehicle 100 respectively. The direction indicators 31 are electrically connected to the ECU 90. The ECU 90 can control the lighting and extinction of the direction indicators 31. For example, the ECU 90 controls the lighting and extinction of the direction indicators 31 in accordance with the operation of a direction indicator lever 55 or a hazard switch 56 that will be described later.

Stop Lamps

Besides, the own vehicle 100 is mounted with stop lamps 32. The stop lamps 32 are devices for mainly informing those outside the own vehicle 100 that a brake pedal 52 has been operated. The stop lamps 32 are provided adjacent to the direction indicators 31 provided in the rear-right corner region and the rear-left corner region of the own vehicle 100, respectively. The stop lamps 32 are electrically connected to the ECU 90. The ECU 90 can control the lighting and extinction of the stop lamps 32. For example, the ECU 90 lights the stop lamps 32 when a driver DR operates the brake pedal 52.

Sensors and the Like

Furthermore, the own vehicle 100 is mounted with an accelerator pedal operation amount sensor 41, a brake pedal operation amount sensor 42, a steering angle sensor 43, a steering torque sensor 44, a shift sensor 45, and a vehicle speed detection device 46.

Accelerator Pedal Operation Amount Sensor

The accelerator pedal operation amount sensor 41 is a sensor that detects an operation amount of an accelerator pedal 51 of the own vehicle 100. The accelerator pedal operation amount sensor 41 is electrically connected to the ECU 90. The accelerator pedal operation amount sensor 41 transmits information on the detected operation amount of the accelerator pedal 51 to the ECU 90. The ECU 90 acquires the operation amount of the accelerator pedal 51 as an accelerator pedal operation amount AP, based on the information.

The ECU 90 acquires a required driving force (a required driving torque) through computation, based on the accelerator pedal operation amount AP and a running speed of the own vehicle 100 (an own vehicle speed), except when follow-up running control and driving trouble tackling control that will be described later are performed. The ECU 90 controls the behavior of the drive device 21 such that the required driving force is output. Besides, when follow-up running control and driving trouble tackling control that will be described later are performed, the ECU 90 decides a driving force that is needed to cause the own vehicle 100 to run as desired through follow-up running control and driving trouble tackling control, and controls the behavior of the drive device 21 such that the driving force is output.

Brake Pedal Operation Amount Sensor

The brake pedal operation amount sensor 42 is a sensor that detects an operation amount of the brake pedal 52 of the own vehicle 100. The brake pedal operation amount sensor 42 is electrically connected to the ECU 90. The brake pedal operation amount sensor 42 transmits information on the detected operation amount of the brake pedal 52 to the ECU 90. The ECU 90 acquires the operation amount of the brake pedal 52 as a brake pedal operation amount BP, based on the information.

The ECU 90 acquires a required braking force (a required braking torque) from the brake pedal operation amount BP through computation, except when follow-up running control and driving trouble tackling control that will be described later are performed. The ECU 90 controls the behavior of the braking device 22 such that the required braking force is output. Besides, when follow-up running control and driving trouble tackling control that will be described later are performed, the ECU 90 decides a braking force that is needed to cause the own vehicle 100 to run as desired through follow-up running control and driving trouble tackling control, and controls the behavior of the braking device 22 such that the braking force is output.

Steering Angle Sensor

The steering angle sensor 43 is a sensor that detects a rotational angle of a steering shaft 53 of the own vehicle 100 with respect to a neutral position thereof. The steering angle sensor 43 is electrically connected to the ECU 90. The steering angle sensor 43 transmits information on the detected rotational angle of the steering shaft 53 to the ECU 90. The ECU 90 acquires the rotational angle of the steering shaft 53 as a steering angle θ, based on the information.

Steering Torque Sensor

The steering torque sensor 44 is a sensor that detects a torque input to the steering shaft 53 via a steering wheel of the own vehicle 100 by the driver DR of the own vehicle 100. The steering torque sensor 44 is electrically connected to the ECU 90. The steering torque sensor 44 transmits information on the detected torque to the ECU 90. The ECU 90 acquires the torque input to the steering shaft 53 by the driver DR via the steering wheel (a driver input steering torque TQdriver), based on the information.

The ECU 90 acquires a required steering force (a required steering torque) based on the steering angle θ, the driver input torque, and the running speed of the own vehicle 100 (the own vehicle speed), and controls the behavior of the steering device 23 such that the required steering torque is output from the steering device 23, except when lane keeping control and driving trouble tackling control that will be described later are performed. Besides, when lane keeping control and driving trouble tackling control that will be described later are performed, the ECU 90 decides a steering force that is needed to cause the own vehicle 100 to run as desired through lane keeping control and driving trouble tackling control, and controls the behavior of the steering device 23 such that the steering force is output.

Shift Sensor

The shift sensor 45 is a sensor that detects a set position of a shift lever 451 as a shift operator of the own vehicle 100. The shift lever 451 is a device that is operated by the driver DR of the own vehicle 100. The set positions of the shift lever 451 that can be set by the driver DR are a forward position (a drive range), a backward position (a rear range), a neutral position (a neutral range), and a parking position (a parking range). The shift sensor 45 is electrically connected to the ECU 90. The shift sensor 45 transmits a signal indicating the detected set position of the shift lever 451 to the ECU 90.

When the shift lever 451 is set in the drive range, the shift sensor 45 transmits a signal indicating that the set position of the shift lever 451 is the drive range to the ECU 90. Upon receiving the signal, the ECU 90 controls the behavior of the transmission device 24 such that the transmission device 24 assumes the drive range state SD.

Besides, when the shift lever 451 is set in the rear range, the shift sensor 45 transmits a signal indicating that the set position of the shift lever 451 is the rear range to the ECU 90. Upon receiving the signal, the ECU 90 controls the behavior of the transmission device 24 such that the transmission device 24 assumes the rear range state SR.

Besides, when the shift lever 451 is set in the neutral range, the shift sensor 45 transmits a signal indicating that the set position of the shift lever 451 is the neutral range to the ECU 90. Upon receiving the signal, the ECU 90 controls the behavior of the transmission device 24 such that the transmission device 24 assumes the neutral range state SN.

Besides, when the shift lever 451 is set in the parking range, the shift sensor 45 transmits a signal indicating that the set position of the shift lever 451 is the parking range to the ECU 90. Upon receiving the signal, the ECU 90 controls the behavior of the transmission device 24 such that the transmission device 24 assumes the parking range state SP.

Incidentally, when follow-up running control and driving trouble tackling control that will be described later are performed, the ECU 90 controls the behavior of the transmission device 24 in accordance with the need to cause the own vehicle 100 to run as desired, through follow-up running control and driving trouble tackling control.

Vehicle Speed Detection Device

The vehicle speed detection device 46 is a device that detects a running speed of the own vehicle 100, and is, for example, a wheel speed sensor. The vehicle speed detection device 46 is electrically connected to the ECU 90. The vehicle speed detection device 46 transmits information on the detected running speed of the own vehicle 100 to the ECU 90. The ECU 90 acquires the running speed of the own vehicle 100 (an own vehicle speed V100), based on the information.

Switches and the Like

Furthermore, the own vehicle 100 is mounted with the direction indicator lever 55, the hazard switch 56, a driving assistance selection operator 57, a stop holding request operator 58, a driver information acquisition device 61, and a peripheral information detection device 62.

Direction Indicator Lever

The direction indicator lever 55 is an instrument that is operated by the driver DR to cause the direction indicators 31 to behave actively. The direction indicator lever 55 is electrically connected to the ECU 90. When the direction indicator lever 55 is operated clockwise, the ECU 90 blinks the direction indicators 31 provided in the front-right corner region and the rear-right corner region, respectively. On the other hand, when the direction indicator lever 55 is operated counterclockwise, the ECU 90 blinks the direction indicators 31 provided in the front-left corner region and the rear-left corner region, respectively. Furthermore, the ECU 90 can also blink all the direction indicators 31 at intervals of a predetermined time. The blinking of all the direction indicators 31 at intervals of the predetermined time will be referred to hereinafter as "hazard lighting".

Hazard Switch

The hazard switch 56 is a switch that is operated by the driver DR to start or stop hazard lighting. The hazard switch 56 is electrically connected to the ECU 90. The ECU 90 starts or stops hazard lighting in accordance with the operation of the hazard switch 56. For example, the ECU 90 starts hazard lighting in the case where the hazard switch 56 is operated to be set at an ON position when the driver DR is not in a driving trouble state as will be described later. Besides, the ECU 90 stops hazard lighting in the case where the hazard switch 56 is operated to be set at an OFF position when the driver DR is not in the driving trouble state as will be described later.

Driving Assistance Selection Operator

The driving assistance selection operator 57 is an instrument that is operated by the driver DR to perform lane keeping control that will be described later, perform follow-up running control that will be described later, and set a predetermined vehicle-to-vehicle distance Dset and a predetermined vehicle speed Vset in follow-up running control, and is, for example, a driving assistance selection switch or the like. The driving assistance selection operator 57 is electrically connected to the ECU 90. When the driving assistance selection operator 57 is operated to perform lane keeping control, the ECU 90 determines that the performance of lane keeping control has been requested. Besides, when the driving assistance selection operator 57 is operated to perform follow-up running control, the ECU 90 determines that the performance of follow-up running control has been requested.

Stop Holding Request Operator

The stop holding request operator 58 is an instrument that is operated by the driver DR to cause the stop holding device 30 to behave actively, and is, for example, a stop holding request switch or the like. The stop holding request operator 58 is electrically connected to the ECU 90. In the case where the stop holding request operator 58 is operated to cause the stop holding device 30 to behave actively, the ECU 90 causes the stop holding device 30 to behave actively such that the own vehicle 100 is held stopped when the own vehicle 100 is stopped, and causes the stop holding device 30 to behave actively such that the own vehicle 100 decelerates at an appropriate deceleration and stops when the own vehicle 100 runs.

Driver Information Acquisition Device

The driver information acquisition device 61 is a device that acquires information on the driver DR, and is equipped with a driver monitor camera 611 and a heart rate sensor 612 in the present example.

Driver Monitor Camera

The driver monitor camera 611 is a device that photographs the driver DR.

The driver monitor camera 611 is electrically connected to the ECU 90. The driver monitor camera 611 transmits information on an image of the photographed driver DR to the ECU 90. The ECU 90 acquires information on a state of the driver DR (a driver information ID), based on the information (driver image information). The ECU 90 can determine whether or not the driver DR is in the driving trouble state, based on the driver information ID. In the present example, the driving trouble state is a state where the driver DR has trouble driving the own vehicle 100 due to unconsciousness or the like.

Heart Rate Sensor

The heart rate sensor 612 is a sensor that detects a heart rate of the driver DR of the own vehicle 100. The heart rate sensor 612 is electrically connected to the ECU 90. The heart rate sensor 612 transmits information on the detected heart rate to the ECU 90. The ECU 90 acquires the heart rate of the driver DR based on the information (heart rate information). The ECU 90 acquires information on the state of the driver DR (the driver information ID), based on the acquired heart rate of the driver DR. The ECU 90 can determine whether or not the driver DR is in the driving trouble state, based on the driver information ID.

Peripheral Information Detection Device

The peripheral information detection device 62 is a device that detects information around the own vehicle 100, and is equipped with an electric wave sensor 621 and an image sensor 622 in the present example.

Electric Wave Sensor

The electric wave sensor 621 is a sensor that detects information on objects around the own vehicle 100 through the use of electric waves. For example, the electric wave sensor 621 is at least one of a radar sensor (a millimeter-wave radar or the like), an acoustic wave sensor such as an ultrasonic sensor (a clearance sonar), and an optical sensor such as a laser radar (LiDAR). The electric wave sensor 621 is electrically connected to the ECU 90. The electric wave sensor 621 emits electric waves, and receives electric waves reflected by an object (reflected waves). The electric wave sensor 621 transmits information on the emitted electric waves and the received electric waves (reflected waves) to the ECU 90. In other words, the electric wave sensor 621 detects objects around the own vehicle 100, and transmits information on the detected objects to the ECU 90. The ECU 90 can acquire information on the objects around the own vehicle 100 (periphery detected information IS), based on the information (electric wave information IR or electric wave data). The objects that are detected through the use of the electric wave sensor 621 are, for example, vehicles, walls, bicycles, people, and the like.

Image Sensor

The image sensor 622 is a sensor that photographs the periphery of the own vehicle 100, and is, for example, a camera. The image sensor 622 is electrically connected to the ECU 90. The image sensor 622 photographs the periphery of the own vehicle 100, and transmits information on the photographed image to the ECU 90. The ECU 90 can acquire information on the periphery of the own vehicle 100 (the periphery detected information IS), based on the information (image information IC or image data).

Notification Device

A notification device 70 is a device that notifies the driver DR of various pieces of information, and is equipped with an acoustic device 71 and a display device 72 in the present example.

Acoustic Device

The acoustic device 71 is a device that outputs sound to an interior of the own vehicle 100, and is, for example, a buzzer or a speaker. The acoustic device 71 is electrically connected to the ECU 90. The ECU 90 can output various sounds and voices to the interior of the own vehicle 100 via the acoustic device 71.

Display Device

The display device 72 is a device that displays an image, and is, for example, a display or the like. The display device 72 is installed in the interior of the own vehicle 100 in such a manner as to be visually recognizable by the driver DR. The display device 72 is electrically connected to the ECU 90. The ECU 90 can cause the display device 72 to display various images.

Announcement Device

An announcement device 80 is a device that announces various pieces of information to those outside the own vehicle 100, and is equipped with a horn 81 in the present example.

Horn

The horn 81 is a device that outputs sound to the outside of the own vehicle 100. The horn 81 is electrically connected to the ECU 90. The ECU 90 can output sound from the horn 81.

Outline of Behavior of Vehicle Control Apparatus

Next, the outline of the behavior of the vehicle control apparatus 10 will be described.

Lane Keeping Control

The vehicle control apparatus 10 performs lane keeping control when the performance of lane keeping control is requested through operation of the driving assistance selection operator 57. Lane keeping control is designed to assist the driver DR in performing steering operation on the own vehicle 100 such that the own vehicle 100 runs between white lines to the right and left thereof (i.e., in an own lane LN1). In more concrete terms, lane keeping control is designed to control the behavior of the steering device 23 such that the own vehicle 100 runs along the center of the own lane LN1.

Incidentally, a reference symbol LN2 in the drawings denotes a lane that is adjacent to the own lane LN1 and in which oncoming vehicles run.

Figure 2A:
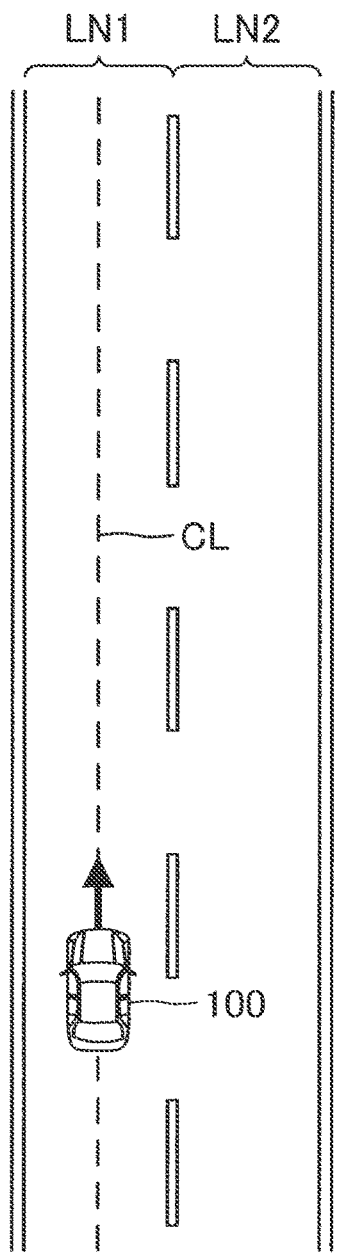
FIG. 2A is a view showing a scene in which the own vehicle runs along the center of a lane through steering assistance according to lane keeping control.

Upon starting lane keeping control, the vehicle control apparatus 10 acquires a line of the center of the own vehicle 100 (a lane centerline CL) (see FIG. 2A). The vehicle control apparatus 10 acquires the lane centerline CL based on the periphery detected information IS.

Figure 2B:
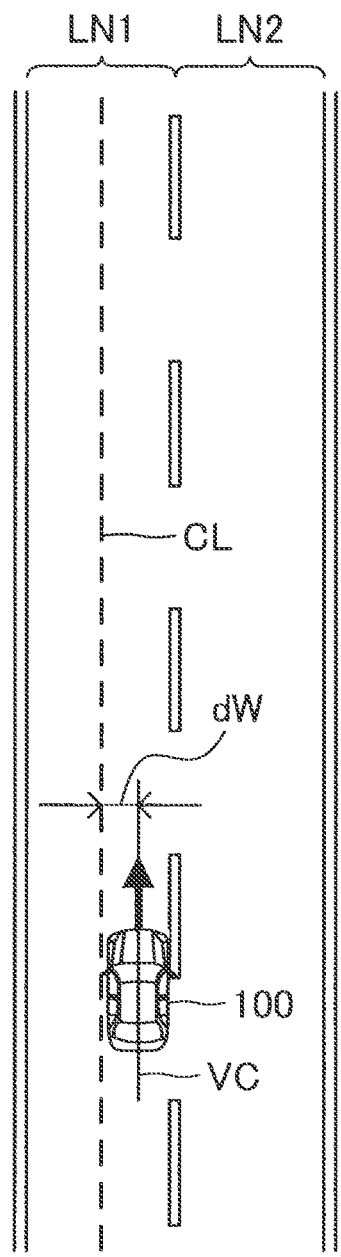
FIG. 2B is a view showing a scene in which the own vehicle has veered to the right from the center of the lane during the performance of lane keeping control.
Figure 2C:
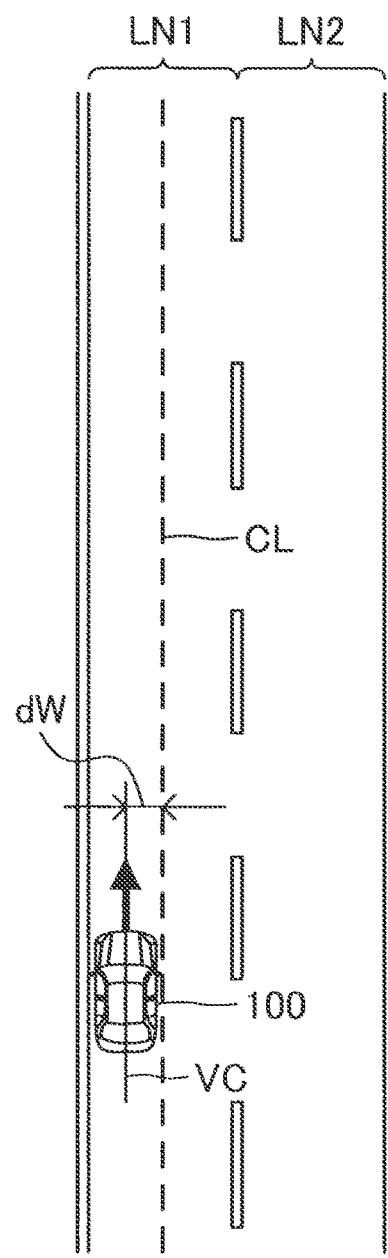
FIG. 2C is a view showing a scene in which the own vehicle has veered to the left from the center of the lane during the performance of lane keeping control.

Furthermore, the vehicle control apparatus 10 acquires a divergence amount dW between the line of the center of the own vehicle 100 (an own vehicle centerline VC) and the lane centerline CL (see FIG. 2B and FIG. 2C). The own vehicle centerline VC is a line that extends along the center of the own vehicle 100 in a width direction thereof, in a longitudinal direction.

When the divergence amount dW becomes larger than zero, the vehicle control apparatus 10 steers the own vehicle 100 by controlling the behavior of the steering device 23 such that the divergence amount dW becomes equal to zero. When the own vehicle 100 veers to the right from the center of the own lane LN1 and the divergence amount dW becomes larger than zero as shown in FIG. 2B, the vehicle control apparatus 10 turns the own vehicle 100 left by controlling the behavior of the steering device 23. On the other hand, when the own vehicle 100 veers to the left from the center of the own lane LN1 and the divergence amount dW becomes larger than zero as shown in FIG. 2C, the vehicle control apparatus 10 turns the own vehicle 100 right by controlling the behavior of the steering device 23. Thus, the own vehicle 100 can be caused to run along the center of the own lane LN1.

Follow-up Running Control

Besides, the vehicle control apparatus 10 performs follow-up running control when the performance of follow-up running control is requested through the operation of the driving assistance selection operator 57. Follow-up running control is designed to automatically accelerate or decelerate the own vehicle 100 by controlling the behavior of the drive device 21 and the braking device 22, such that the own vehicle 100 runs while following a vehicle running in front of the own vehicle 100 (a preceding vehicle 200).

Figure 3A:
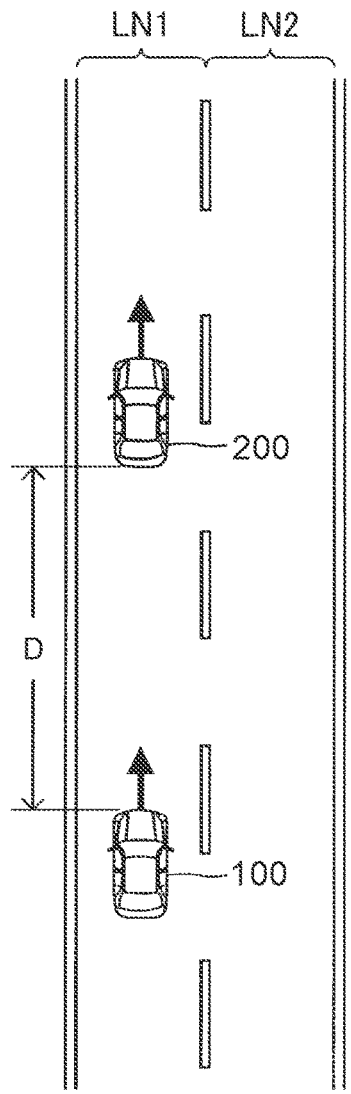
FIG. 3A is a view showing a distance (vehicle-to-vehicle distance) between the own vehicle and a preceding vehicle.

Upon starting follow-up running control, the vehicle control apparatus 10 acquires a distance between the own vehicle 100 and the preceding vehicle 200 (a vehicle-to-vehicle distance D) (see FIG. 3A). The vehicle control apparatus 10 acquires the vehicle-to-vehicle distance D based on the periphery detected information IS.

Furthermore, the vehicle control apparatus 10 acquires a difference (a relative speed dV) between the vehicle speed of the own vehicle 100 (the own vehicle speed V100) and a vehicle speed of the preceding vehicle 200 (a preceding vehicle speed V200). The vehicle control apparatus 10 acquires the relative speed dV based on the periphery detected information IS.

Moreover, the vehicle control apparatus 10 sets the vehicle-to-vehicle distance D at which a time obtained through division by the relative speed dV at that time (a predictive arrival time TTC) is equal to a predetermined time (a predetermined predictive arrival time TTCref), as a target vehicle-to-vehicle distance Dtgt. That is, the vehicle control apparatus 10 sets the vehicle-to-vehicle distance D at which a relationship 1 shown below is established among the relative speed dV at that time, the predetermined predictive arrival time TTCref, and the vehicle-to-vehicle distance D, as the target vehicle-to-vehicle distance Dtgt.

$$TTCref=D/dV \qquad (1)$$

Follow-up running control is designed to cause the own vehicle 100 to run while following the preceding vehicle 200, by controlling the behavior of the drive device 21 and the braking device 22 such that the vehicle-to-vehicle distance D coincides with the target vehicle-to-vehicle distance Dtgt.

Figure 3B:
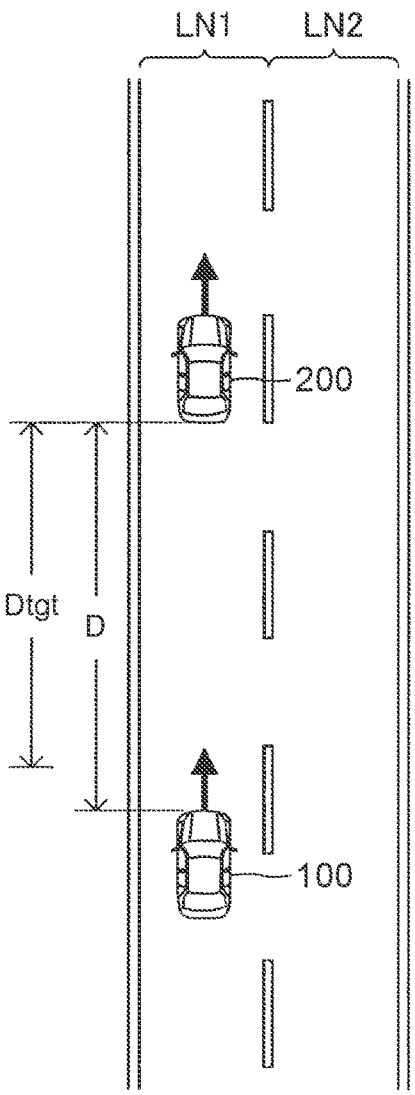
FIG. 3B is a view showing a scene in which the vehicle-to-vehicle distance has become longer than a target vehicle-to-vehicle distance in follow-up running control.
Figure 3C:
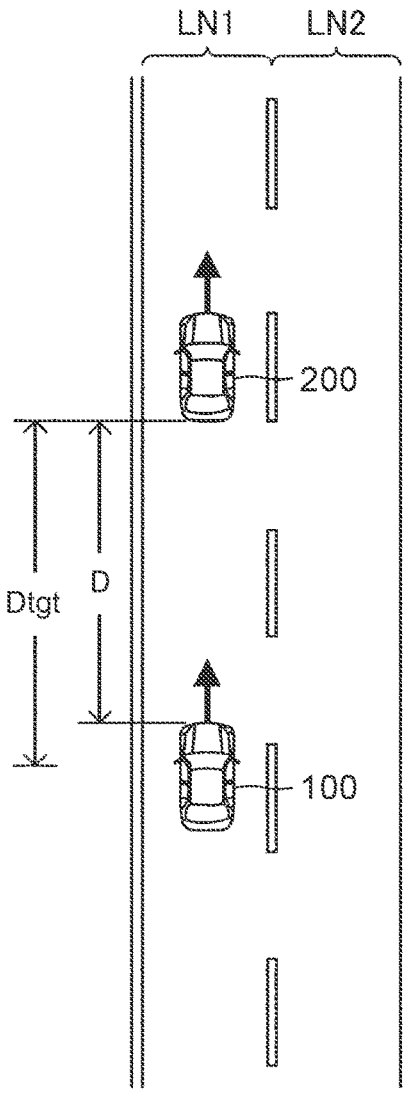
FIG. 3C is a view showing a scene in which the vehicle-to-vehicle distance has become shorter than the target vehicle-to-vehicle distance in follow-up running control.

When the vehicle-to-vehicle distance D becomes longer than the target vehicle-to-vehicle distance Dtgt as shown in FIG. 3B, the vehicle control apparatus 10 accelerates the own vehicle 100 by controlling the behavior of the drive device 21. On the other hand, when the vehicle-to-vehicle distance D becomes shorter than the target vehicle-to-vehicle distance Dtgt as shown in FIG. 3C, the vehicle control apparatus 10 decelerates the own vehicle 100 by controlling the behavior of the drive device 21 and/or the braking device 22. Thus, the own vehicle 100 can be caused to run while following the preceding vehicle 200.

Incidentally, when the preceding vehicle 200 does not exist, the vehicle control apparatus 10 performs constant-speed running control. Constant-speed running control is designed to automatically accelerate and decelerate the own vehicle 100 by controlling the behavior of the drive device 21 and/or the braking device 22 such that the own vehicle speed V100 coincides with the predetermined vehicle speed Vset. The predetermined vehicle speed Vset is a vehicle speed that is set through the operation of the driving assistance selection operator 57 by the driver DR.

Driving Trouble Tackling Control

Besides, in the case where the driver DR is in the driving trouble state when lane keeping control and follow-up running control are performed, the vehicle control apparatus 10 performs driving trouble tackling control (so-called dead man control). Driving trouble tackling control includes a driving trouble notification process, a deceleration process, and a driving trouble announcement process.

The driving trouble notification process is a process for notifying a passenger of the own vehicle 100 that the own vehicle 100 will be automatically stopped, that the own vehicle 100 has been stopped, or the like to call the driver DR's attention or because the driver DR has fallen into the driving trouble state.

The deceleration process is a process of decelerating and stopping the own vehicle 100. In more concrete terms, the deceleration process is a process of automatically decelerating and stopping the own vehicle 100 by controlling the behavior of the drive device 21 and the braking device 22 such that the own vehicle 100 is stopped safely.

The driving trouble announcement process is a process of announcing to those outside the own vehicle 100 that the driver DR has fallen into the driving trouble state. In the present example in particular, the driving trouble announcement process is a process for announcing to those outside the own vehicle 100 that the own vehicle 100 will be stopped, that the own vehicle 100 has been stopped, or the like because the driver DR has fallen into the driving trouble state.

The vehicle control apparatus 10 monitors the state of the driver DR based on the driver information ID during the running of the own vehicle 100, and continually determines whether or not a driving trouble condition CD that the driver DR is in the driving trouble state has been fulfilled.

Figure 4:
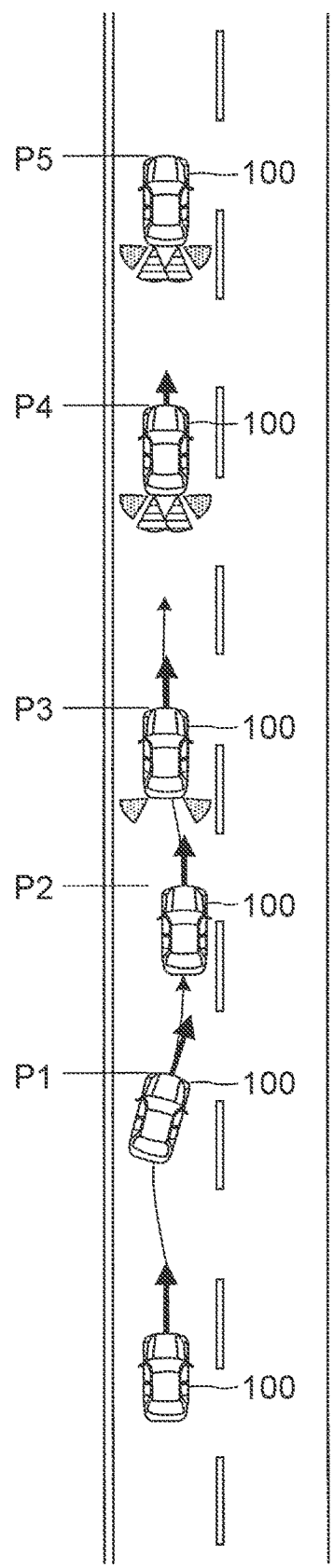
FIG. 4 is a view showing the own vehicle that is caused to run through driving trouble tackling control when a driver of the own vehicle has fallen into a driving trouble state.

For example, if it is determined that the driving trouble condition CD is fulfilled when the own vehicle 100 runs past a spot denoted by a reference symbol P1 in FIG. 4, the vehicle control apparatus 10 determines whether or not a time during which it is determined that the driving trouble condition CD is fulfilled (a first duration time T1) has reached a predetermined time (a first determination time T1th).

For example, if the first duration time T1 reaches the first determination time T1th when the own vehicle 100 runs to a spot denoted by a reference symbol P2 in FIG. 4, the vehicle control apparatus 10 starts the driving trouble notification process while continuing to perform lane keeping control and follow-up running control.

At this time, the vehicle control apparatus 10 starts a steering wheel holding request display process and a first warning sound output process as the driving trouble notification process. The steering wheel holding request display process is a process of causing the display device 72 to display an image requesting the driver DR to grip the steering wheel. Besides, the first warning sound output process is a process of causing the acoustic device 71 to intermittently output a sound of a predetermined volume (a first volume V1) at intervals of a predetermined time (a first time interval Tiv1).

After that, the vehicle control apparatus 10 determines whether or not a time (second duration time T2) during which it is determined that the driving trouble condition CD is fulfilled after the first duration time T1 reaches the first determination time T1th has reached a predetermined time (a second determination time T2th).

For example, if the second duration time T2 reaches the second determination time T2th when the own vehicle 100 runs to a spot denoted by a reference symbol P3 in FIG. 4, the vehicle control apparatus 10 starts the deceleration process and the driving trouble announcement process while continuing to perform lane keeping control, follow-up running control, and the driving trouble notification process.

At this time, the vehicle control apparatus 10 starts a gentle deceleration process as the deceleration process. The gentle deceleration process is a process of decelerating the own vehicle 100 at a relatively small deceleration (a first deceleration GD1) by controlling the behavior of the drive device 21 or the braking device 22. It should be noted, however, that the vehicle control apparatus 10 compares the deceleration in this gentle deceleration process (the first deceleration GD1) with a deceleration set in follow-up running control (a follow-up deceleration), decelerates the own vehicle 100 at the first deceleration GD1 when the first deceleration GD1 is larger than the follow-up deceleration, and decelerates the own vehicle 100 at the follow-up deceleration when the follow-up deceleration is larger than the first deceleration GD1.

Besides, at this time, the vehicle control apparatus 10 starts the steering wheel holding request display process, an automatic stop notice display process, and a second warning sound output process as the driving trouble notification process. As described previously, the steering wheel holding request display process is a process of causing the display device 72 to display an image requesting the driver DR to grip the steering wheel. Besides, the automatic stop notice display process is a process of causing the display device 72 to display an image giving a notice of automatic stop of the own vehicle 100 to the passenger of the own vehicle 100. Besides, the second warning sound output process is a process of causing the acoustic device 71 to intermittently output a sound of a predetermined volume (a second volume V2) at intervals of a predetermined time (a second time interval Tiv2). The second volume V2 is set larger than the first volume V1, and the second time interval Tiv2 is set shorter than the first time interval Tiv1.

Besides, at this time, the vehicle control apparatus 10 starts the hazard lighting process as the driving trouble announcement process. The hazard lighting process is a process of lighting the direction indicators 31 as a hazard warning.

After that, the vehicle control apparatus 10 determines whether or not a time (third duration time T3) during which it is determined that the driving trouble condition CD is fulfilled after the second duration time T2 reaches the second determination time T2th has reached a predetermined time (a third determination time T3th).

For example, if the third duration time T3 reaches the third determination time T3th when the own vehicle 100 runs to a spot denoted by a reference symbol P4 in FIG. 4, the vehicle control apparatus 10 changes over the deceleration process from the gentle deceleration process to a stop deceleration process while continuing to perform lane keeping control, the driving trouble notification process, and the driving trouble announcement process. The stop deceleration process is a process of decelerating the own vehicle 100 at a relatively large deceleration (a second deceleration GD2) to stop the own vehicle 100 by controlling the behavior of the braking device 22. The second deceleration GD2 is set larger than the first deceleration GD1.

Besides, at this time, the vehicle control apparatus 10 changes over the driving trouble notification process from the steering wheel holding request display process, the automatic stop notice display process, and the second warning sound output process to an automatic stop performance display process and a third warning sound output process. The automatic stop performance display process is a process of causing the display device 72 to display an image informing the passenger of the own vehicle 100 that the control of automatically stopping the own vehicle 100 is performed. Besides, the third warning sound output process is a process of causing the acoustic device 71 to intermittently output a sound of a predetermined volume (a third volume V3) at intervals of a predetermined time (a third time interval Tiv3). The third volume V3 is set larger than the second volume V2, and the third time interval Tiv3 is set shorter than the second time interval Tiv2.

Besides, at this time, the vehicle control apparatus 10 starts a horn honking process and a stop lamp lighting process while continuing to perform the hazard lighting process, as the driving trouble announcement process. The horn honking process is a process of causing the horn 81 to output a sound. Besides, the stop lamp lighting process is a process of lighting the stop lamps 32.

After that, for example, when the own vehicle 100 is stopped at a spot denoted by a reference symbol P5 in FIG. 4, the vehicle control apparatus 10 stops lane keeping control, and changes over the deceleration process from the stop deceleration process to a stop holding process, while continuing to perform the driving trouble notification process and the driving trouble announcement process. The stop holding process is a process of holding the own vehicle 100 stopped by controlling the behavior of the braking device 22 and the stop holding device 30.

Besides, at this time, the vehicle control apparatus 10 changes over the driving trouble notification process from the automatic stop performance display process and the third warning sound output process to an automatic stop completion display process and a fourth warning sound output process. The automatic stop completion process is a process of causing the display device 72 to display an image informing the passenger of the own vehicle 100 that the stopping of the own vehicle 100 has been completed. Besides, the fourth warning sound output process is a process of causing the acoustic device 71 to intermittently output a sound of a predetermined volume (a fourth volume V4) at intervals of a predetermined time (a fourth time interval Tiv4). The fourth volume V4 is set larger than the third volume V3, and the fourth time interval Tiv4 is set shorter than the third time interval Tiv3.

Besides, at this time, the vehicle control apparatus 10 continues to perform the hazard lighting process, the horn honking process, and the stop lamp lighting process, as the driving trouble announcement process.

How to Cope with Operation of Hazard Switch

By the way, the driver DR or the passenger of the own vehicle 100 may operate the hazard switch 56 in an attempt to stop driving trouble tackling control that has been started in response to the determination that the driver DR has fallen into the driving trouble state. Thus, there are moves to structure a system in such a manner as to stop driving trouble tackling control when the hazard switch 56 is operated. In the case where the system is thus structured, driving trouble tackling control is stopped when the hazard switch 56 is operated after the start of driving trouble tackling control.

On the other hand, however, the passenger (or the driver DR himself or herself in some cases) of the own vehicle 100 who has noticed that driving trouble tackling control has been started in response to the falling of the driver DR into the driving trouble state may operate the hazard switch 56 in an attempt to announce the start of driving trouble tackling control in response to the falling of the driver DR into the driving trouble state to those around the own vehicle 100. At this time, the passenger of the own vehicle 100 who has operated the hazard switch 56 has no intention of stopping driving trouble tackling control. In such a case, it is not preferable to stop driving trouble tackling control just because the hazard switch 56 has been operated.

In view of these circumstances, the vehicle control apparatus 10 is configured to cope with driving trouble tackling control in the following manner when the hazard switch 56 is operated after driving trouble tackling control is started in response to the determination that the driver DR is in the driving trouble state.

Figure 5:
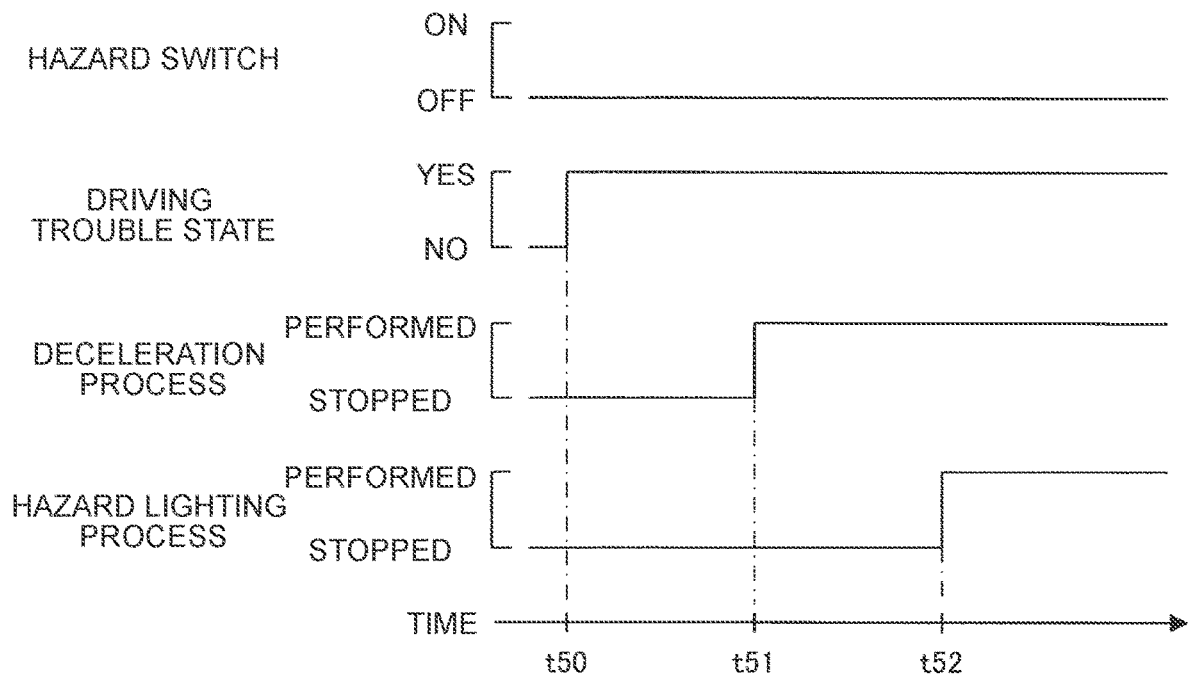
FIG. 5 is a time chart showing performance states of deceleration control and a hazard lighting process in the case where a hazard switch is not operated after it is determined that the driver is in the driving trouble state, in the embodiment in which deceleration control is started at a predetermined timing and then the hazard lighting process is started at a predetermined timing when the hazard switch is not operated after it is determined that the driver is in the driving trouble state.

That is, as shown in FIG. 5, the vehicle control apparatus 10 determines that the driver DR has fallen into the driving trouble state and starts driving trouble tackling control (at time t50). After that, if the hazard switch 56 is not operated, the vehicle control apparatus 10 starts deceleration control at a predetermined timing (at time t51), and then starts the hazard lighting process at a predetermined timing (at time t52), as described already.

Figure 6:
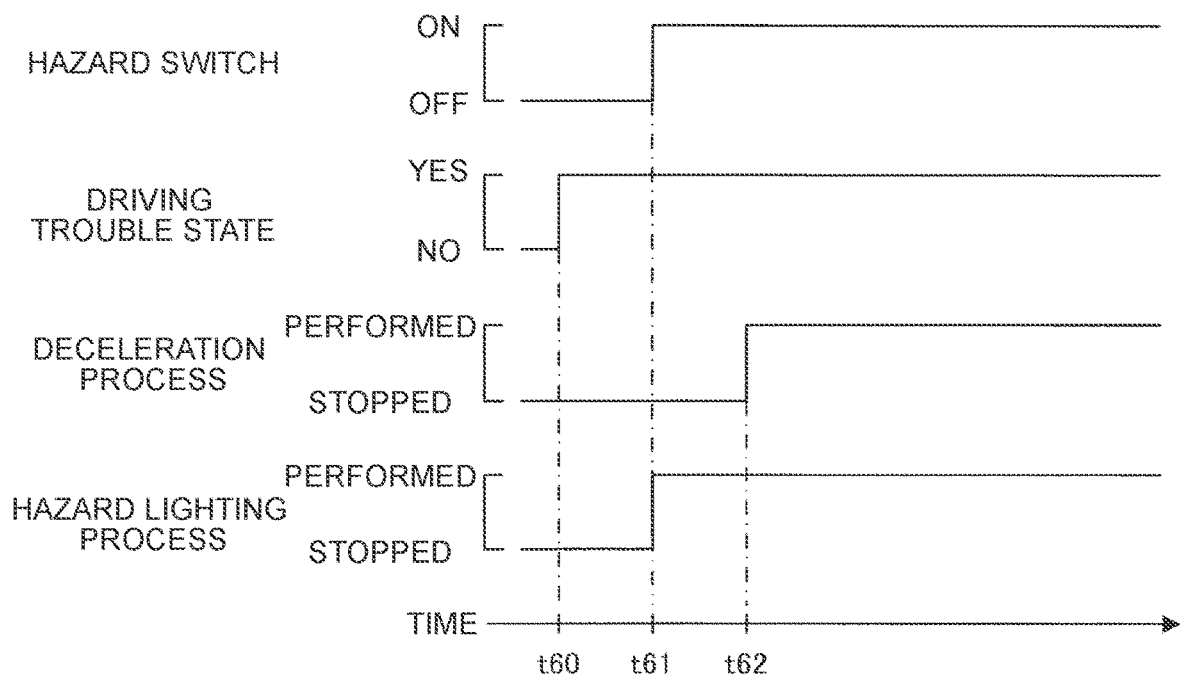
FIG. 6 is a time chart showing performance states of deceleration control and the hazard lighting process in the case where the hazard switch is operated before the start of deceleration control at a predetermined timing, after it is determined that the driver is in the driving trouble state, in the embodiment shown in FIG. 5.

On the other hand, as shown in FIG. 6, the vehicle control apparatus 10 determines that the driver DR has fallen into the driving trouble state and starts driving trouble tackling control (at time t60). After that, when the hazard switch 56 is operated at a time point (at time t61) prior to the start of deceleration control at a predetermined timing, the vehicle control apparatus 10 starts the hazard lighting process at the time point (at time t61), and then starts deceleration control at a predetermined timing (at time t62). Accordingly, in this case, driving trouble tackling control is continued even after the hazard switch 56 is operated.

On the other hand, as shown in FIG. 7, the vehicle control apparatus 10 determines that the driver DR is in the driving trouble state and starts driving trouble tackling control (at time t70), and then starts deceleration control at a predetermined timing (at time t71). After that, when the hazard switch 56 is operated at a time point (at time t72) prior to the start of the hazard lighting process at a predetermined timing, the vehicle control apparatus 10 starts the hazard lighting process at the time point (at time t72). Accordingly, in this case, driving trouble tackling control is continued even after the hazard switch 56 is operated.

On the other hand, as shown in FIG. 8, the vehicle control apparatus 10 determines that the driver DR is in the driving trouble state and starts driving trouble tackling control (at time t80), starts deceleration control at a predetermined timing (at time t81), and then starts the hazard lighting process at a predetermined timing (at time t82). When the hazard switch 56 is then operated at a time point (at time t83), the vehicle control apparatus 10 stops driving trouble tackling control at the time point (at time t83). Accordingly, in this case, both deceleration control and the hazard lighting process are stopped.

When the hazard switch 56 is operated after driving trouble tackling control is started in response to the determination that the driver DR is in the driving trouble state, the foregoing measure is taken. Thus, in a scene (a scene shown in FIG. 6 or FIG. 7) where the passenger or the like of the own vehicle 100 is estimated to have operated the hazard switch 56 with the intention of announcing the start of driving trouble tackling control to those around the own vehicle 100, the hazard lighting process is started without stopping driving trouble tackling control. Therefore, a measure matching the original intention of the passenger or the like of the own vehicle 100 is taken.

On the other hand, in a scene (a scene shown in FIG. 8) in which the passenger or the like of the own vehicle 100 is estimated to have operated the hazard switch 56 with the intention of stopping driving trouble tackling control, driving trouble tackling control is stopped. Therefore, a measure matching the original intention of the passenger or the like of the own vehicle 100 is taken.

Incidentally, the vehicle control apparatus 10 may be configured to first start the hazard lighting process and then start deceleration control, upon starting driving trouble tackling control in response to the determination that the driver DR is in the driving trouble state. In this case, the vehicle control apparatus 10 is configured to take the following measure as to driving trouble tackling control, when the hazard switch 56 is operated after driving trouble tackling control is started in response to the determination that the driver DR is in the driving trouble state.

Figure 9:
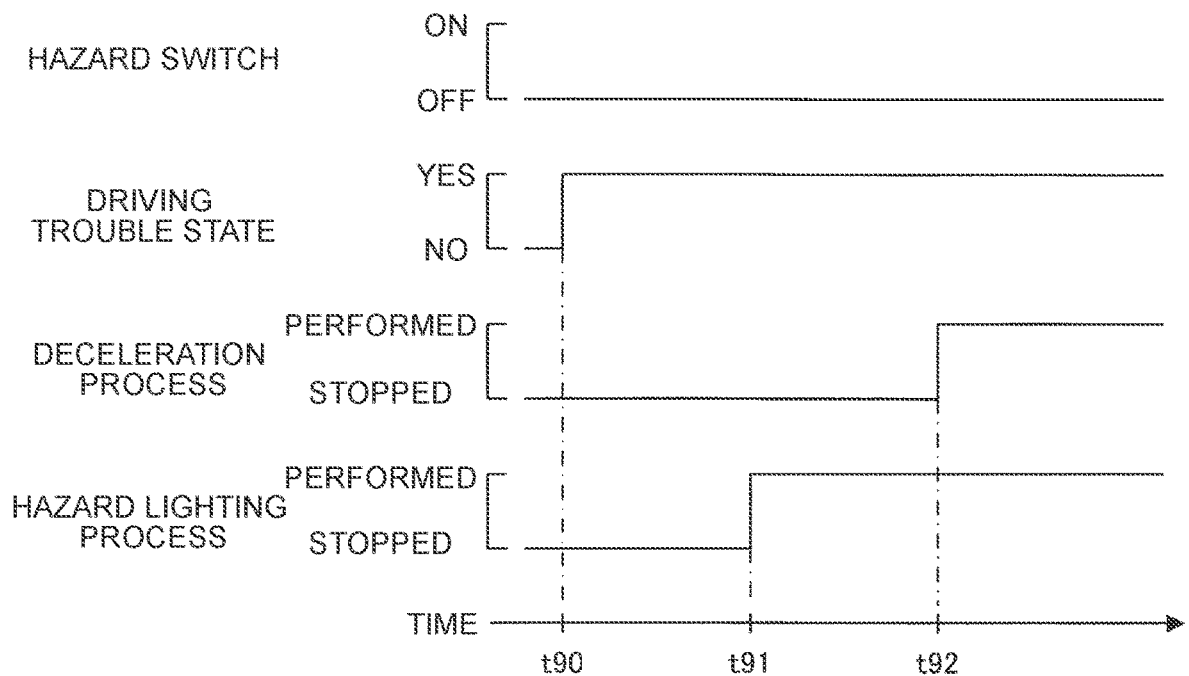
FIG. 9 is a time chart showing performance states of deceleration control and the hazard lighting process in the case where the hazard switch is not operated after it is determined that the driver is in the driving trouble state, in the embodiment in which the hazard lighting process is started at a predetermined timing and then deceleration control is started at a predetermined timing when the hazard switch is not operated after it is determined that the driver is in the driving trouble state.

That is, as shown in FIG. 9, the vehicle control apparatus 10 determines that the driver DR is in the driving trouble state and starts driving trouble tackling control (at time t90). Then, if the hazard switch 56 is not operated, the vehicle control apparatus 10 starts the hazard lighting process at a predetermined timing (at time t91), and then starts deceleration control at a predetermined timing (at time t92).

Figure 10:
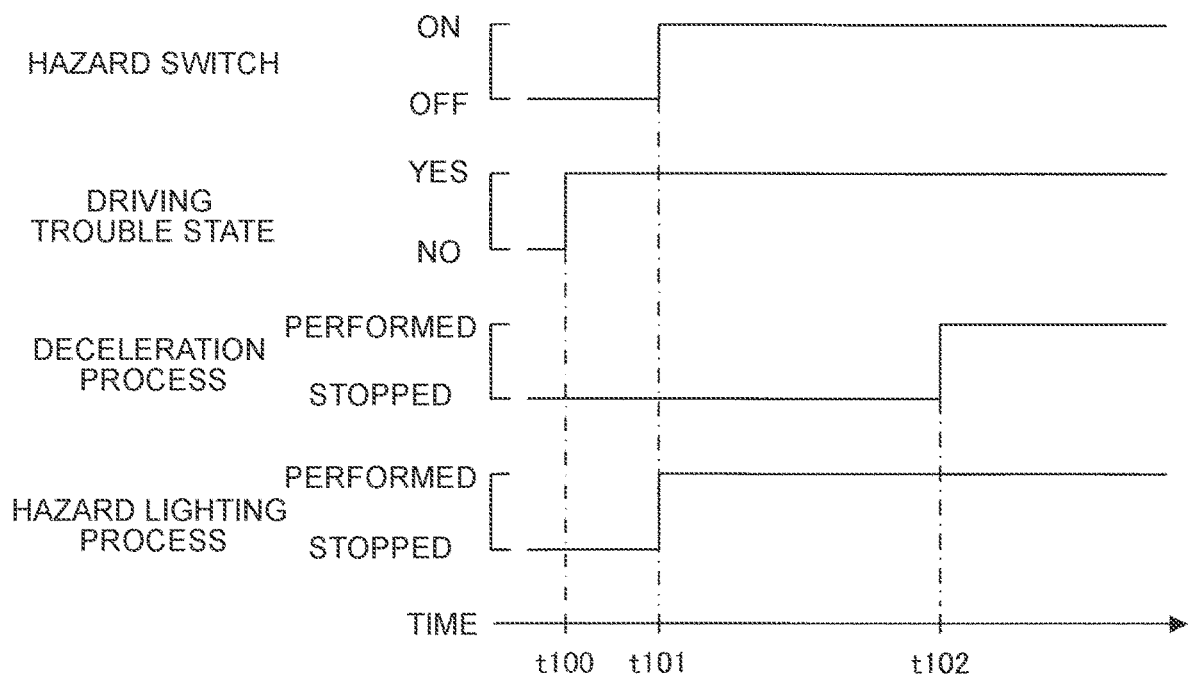
FIG. 10 is a time chart showing performance states of deceleration control and the hazard lighting process in the case where the hazard switch is operated before the start of the hazard lighting process at a predetermined timing, after it is determined that the driver is in the driving trouble state, in the embodiment shown in FIG. 9.

On the other hand, as shown in FIG. 10, the vehicle control apparatus 10 determines that the driver DR is in the driving trouble state and starts driving trouble tackling control (at time t100). Then, when the hazard switch 56 is operated at a time point (at time t101) prior to the start of the hazard lighting process at the predetermined timing, the vehicle control apparatus 10 starts the hazard lighting process at the time point (at time t101), and then starts deceleration control at a predetermined timing (at time t102). Accordingly, in this case, driving trouble tackling control is continued even after the hazard switch 56 is operated.

Figure 11:
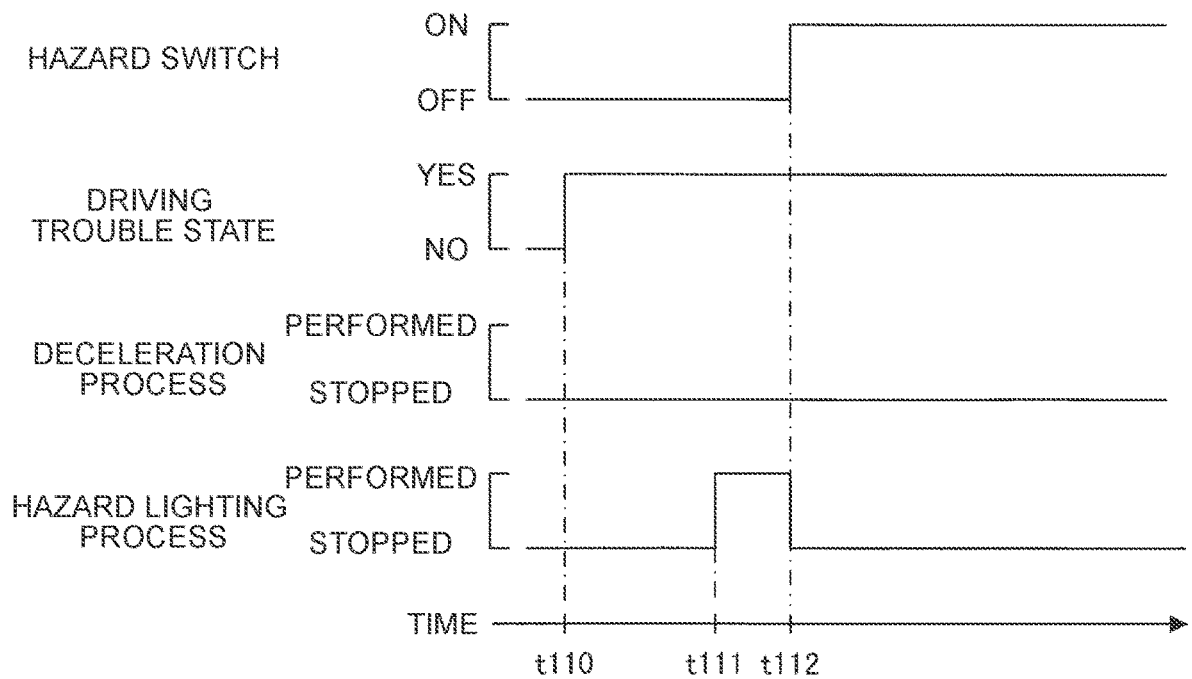
FIG. 11 is a time chart showing performance states of deceleration control and the hazard lighting process in the case where the hazard switch is operated before the start of deceleration control at a predetermined timing, after the start of the hazard lighting process at a predetermined timing, in the embodiment shown in FIG. 9.

On the other hand, as shown in FIG. 11, the vehicle control apparatus 10 determines that the driver DR is in the driving trouble state and starts driving trouble tackling control (at time t110), and then starts the hazard lighting process at a predetermined timing (at time t111). After that, when the hazard switch 56 is operated at a time point (at time t112) prior to the start of deceleration control at a predetermined timing, the vehicle control apparatus 10 stops driving trouble tackling control at the time point (at time t112). Accordingly, in this case, both deceleration control and the hazard lighting process are stopped.

Figure 12:
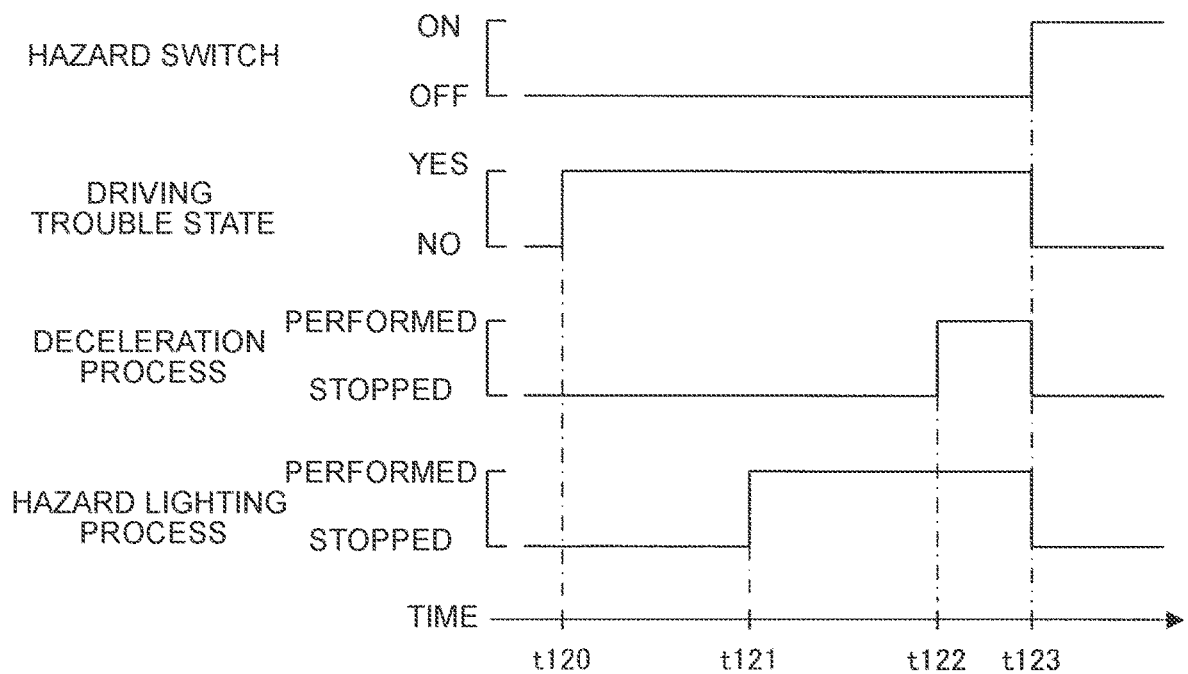
FIG. 12 is a time chart showing performance states of deceleration control and the hazard lighting process in the case where the hazard switch is operated after the start of the hazard lighting process and deceleration control at predetermined timings, in the embodiment shown in FIG. 9.

On the other hand, as shown in FIG. 12, the vehicle control apparatus 10 determines that the driver DR is in the driving trouble state and starts driving trouble tackling control (at time t120), starts the hazard lighting process at a predetermined timing (at time t121), and then starts deceleration control at a predetermined timing (at time t122). After that, when the hazard switch 56 is operated at a time point (at time t123), the vehicle control apparatus 10 stops driving trouble tackling control at the time point (at time t123). Accordingly, in this case, both deceleration control and the hazard lighting process are stopped.

When the hazard switch 56 is operated after driving trouble tackling control is started in response to the determination that the driver DR is in the driving trouble state, the foregoing measure is taken. Thus, in a scene (a scene shown in FIG. 10) in which the passenger or the like of the own vehicle 100 is estimated to have operated the hazard switch 56 with the intention of announcing the start of driving trouble tackling control to those around the own vehicle 100, the hazard lighting process is started without stopping driving trouble tackling control. Therefore, a measure matching the original intention of the passenger or the like of the own vehicle 100 is taken.

On the other hand, in scenes (scenes shown in FIG. 11 and FIG. 12) in which the passenger or the like of the own vehicle 100 is estimated to have operated the hazard switch 56 with the intention of stopping driving trouble tackling control, driving trouble tackling control is stopped. Therefore, a measure matching the original intention of the passenger or the like of the own vehicle 100 is taken.

Besides, the vehicle control apparatus 10 may be configured to start the hazard lighting process and deceleration control simultaneously, upon starting driving trouble tackling control in response to the determination that the driver DR is in the driving trouble state. In this case, the vehicle control apparatus 10 is configured to take the following measure as to driving trouble tackling control, when the hazard switch 56 is operated after driving trouble tackling control is started in response to the determination that the driver DR is in the driving trouble state.

Figure 13:
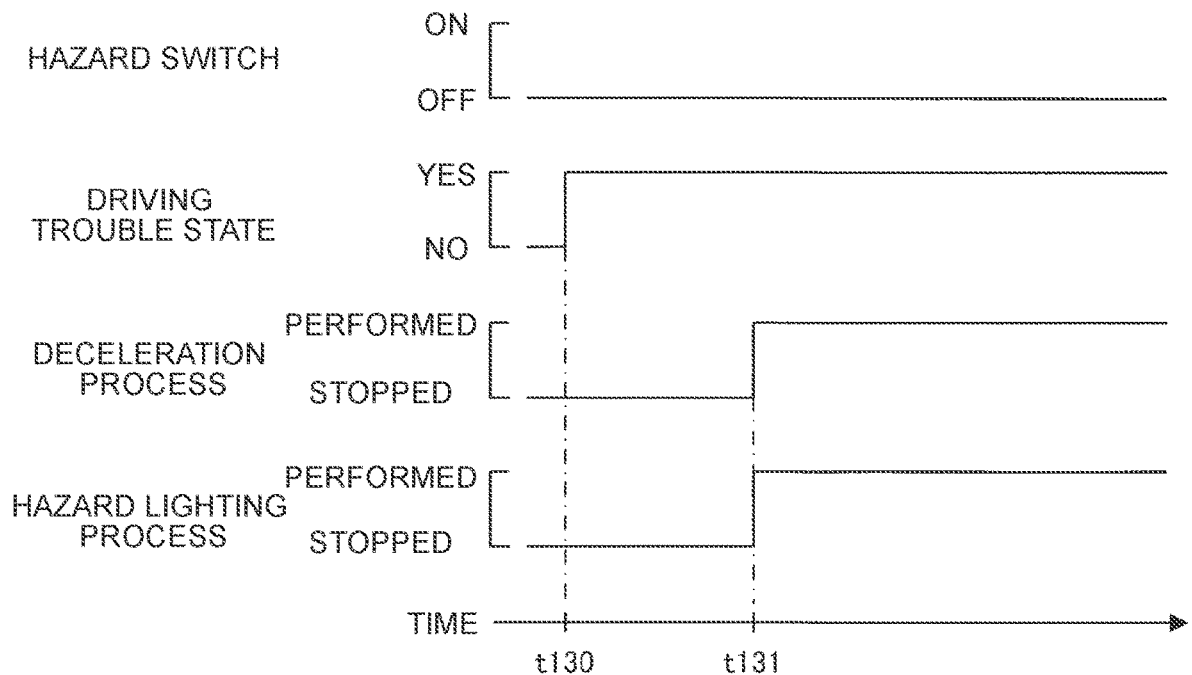
FIG. 13 is a time chart showing performance states of deceleration control and the hazard lighting process in the case where the hazard switch is not operated after it is determined that the driver is in the driving trouble state, in the embodiment in which deceleration control and the hazard lighting process are started at a predetermined timing when the hazard switch is not operated after it is determined that the driver is in the driving trouble state.

That is, as shown in FIG. 13, the vehicle control apparatus 10 determines that the driver DR is in the driving trouble state and starts driving trouble tackling control (at time t130). Then, if the hazard switch 56 is not operated, the vehicle control apparatus 10 starts deceleration control and the hazard lighting process at a predetermined timing (at time t131).

Figure 14:
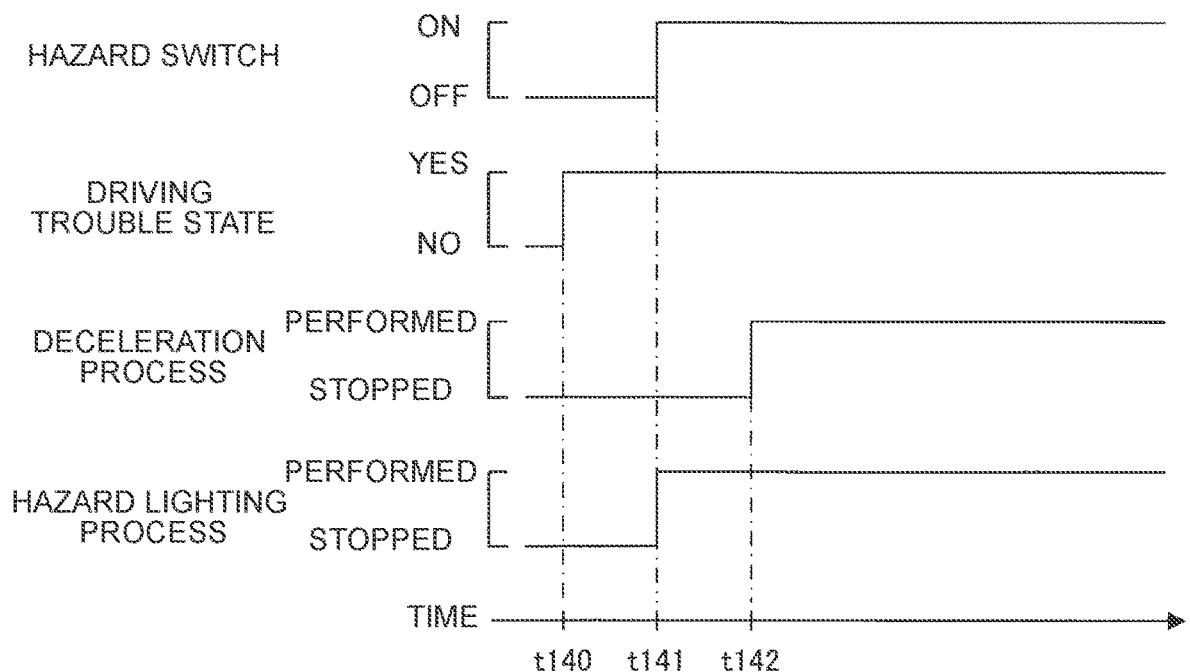
FIG. 14 is a time chart showing performance states of deceleration control and the hazard lighting process in the case where the hazard switch is operated before the start of deceleration control and the hazard lighting process at a predetermined timing, after it is determined that the driver is in the driving trouble state, in the embodiment shown in FIG. 13.

On the other hand, as shown in FIG. 14, the vehicle control apparatus 10 determines that the driver DR is in the driving trouble state and starts driving trouble tackling control (at time t140). After that, when the hazard switch 56 is operated at a time point (at time t141) prior to the start of deceleration control and the hazard lighting process at a predetermined timing, the vehicle control apparatus 10 starts the hazard lighting process at the time point (at time t141), and then starts deceleration control at a predetermined timing (at time t142). Accordingly, in this case, driving trouble tackling control is continued even after the hazard switch 56 is operated.

Figure 15:
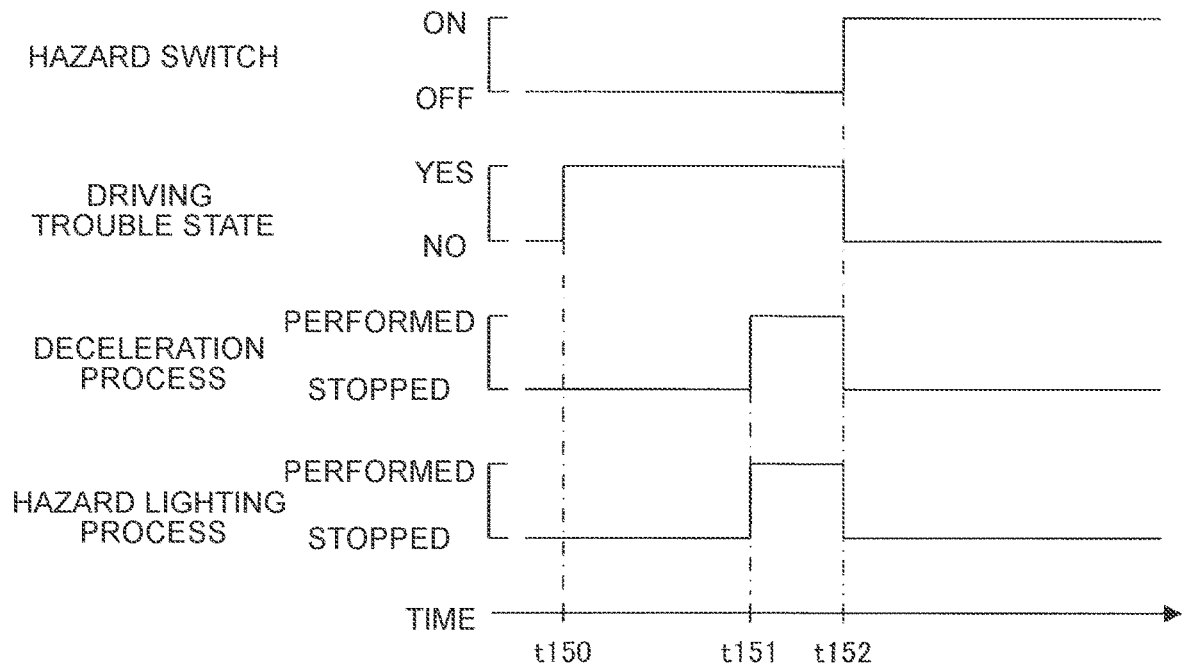
FIG. 15 is a time chart showing performance states of deceleration control and the hazard lighting process in the case where the hazard switch is operated after the start of deceleration control and the hazard lighting process at a predetermined timing, in the embodiment shown in FIG. 13.

On the other hand, as shown in FIG. 15, the vehicle control apparatus 10 determines that the driver DR is in the driving trouble state and starts driving trouble tackling control (at time t150), and then starts deceleration control and the hazard lighting process at a predetermined timing (at time t151). After that, when the hazard switch 56 is operated at a time point (at time t152), the vehicle control apparatus 10 stops driving trouble tackling control at the time point (at time t152). Accordingly, in this case, both deceleration control and the hazard lighting process are stopped.

When the hazard switch 56 is operated after driving trouble tackling control is started in response to the determination that the driver DR is in the driving trouble state, the foregoing measure is taken. Thus, in a scene (a scene shown in FIG. 14) in which the passenger or the like of the own vehicle 100 is estimated to have operated the hazard switch 56 with the intention of announcing the start of driving trouble tackling control to those around the own vehicle 100, the hazard lighting process is started without stopping driving trouble tackling control. Therefore, a measure matching the original intention of the passenger or the like of the own vehicle 100 is taken.

On the other hand, in a scene (a scene shown in FIG. 15) in which the passenger or the like of the own vehicle 100 is estimated to have operated the hazard switch 56 with the intention of stopping driving trouble tackling control, driving trouble tackling control is stopped. Therefore, a measure matching the original intention of the passenger or the like of the own vehicle 100 is taken.

Stop of Driving Assistance Control

By the way, when a predetermined condition is fulfilled, it is preferable to stop driving assistance control in accordance with the fulfilled condition. Thus, when a predetermined condition is fulfilled, the vehicle control apparatus 10 stops driving assistance control in accordance with the fulfilled condition.

In concrete terms, the vehicle control apparatus 10 stops lane keeping control when one of first to fourth lane keeping stop conditions CLs1 to CLs4 is fulfilled during the performance of lane keeping control. The first lane keeping stop condition CLs1 is a condition that the end of lane keeping control has been requested through the operation of the driving assistance selection operator 57. Besides, the second lane keeping stop condition CLs2 is that the driver input steering torque TQdriver has become equal to or larger than a predetermined steering torque TQdriver_th. Besides, the third lane keeping stop condition CLs3 is a condition that the stop holding request operator 58 is operated and driving trouble tackling control is not being performed. Besides, the fourth lane keeping stop condition CLs4 is a condition that the shift lever 451 is operated to be set in the parking range and driving trouble tackling control is not being performed.

Besides, the vehicle control apparatus 10 stops follow-up running control when one of first to fifth follow-up running stop conditions CAs1 to CAs5 is fulfilled during the performance of follow-up running control. The first follow-up running stop condition CAs1 is a condition that the end of follow-up running control has been requested through the operation of the driving assistance selection operator 57. The second follow-up running stop condition CAs2 is a condition that the accelerator pedal operation amount AP has become equal to or larger than a predetermined accelerator pedal operation amount threshold APth. The third follow-up running stop condition CAs3 is a condition that the brake pedal operation amount BP has become equal to or larger than a predetermined brake pedal operation amount threshold BPth. Besides, the fourth follow-up running stop condition CAs4 is a condition that the stop holding request operator 58 is operated and driving trouble tackling control is not being performed. Besides, the fifth follow-up running stop condition CAs5 is a condition that the shift lever 451 is operated to be set in the parking range and driving trouble tackling control is not being performed.

Besides, the vehicle control apparatus 10 determines that the driver DR is not in the driving trouble state (i.e., the driver DR is in a normal state), and stops driving trouble tackling control, when one of first to fifth driving trouble tackling stop conditions CDs1 to CDs5 is fulfilled during the performance of driving trouble tackling control.

The first driving trouble tackling stop condition CDs' is a condition that the steering wheel has been operated. The vehicle control apparatus 10 determines that the steering wheel has been operated, upon detecting the driver input steering torque TQdriver that is equal to or larger than the predetermined steering torque threshold TQth.

The second driving trouble tackling stop condition CDs2 is a condition that the accelerator pedal 51 has been operated. The vehicle control apparatus 10 determines that the accelerator pedal 51 has been operated, upon detecting the accelerator pedal operation amount AP that is equal to or larger than the predetermined accelerator pedal operation amount threshold APth.

The third driving trouble tackling stop condition CDs3 is a condition that the brake pedal 52 has been operated. The vehicle control apparatus 10 determines that the brake pedal 52 has been operated, upon detecting the brake pedal operation amount BP that is equal to or larger than the predetermined brake pedal operation amount threshold BPth.

The fourth driving trouble tackling stop condition CDs4 is a condition that the driving assistance selection operator 57 has been performed.

The fifth driving trouble tackling stop condition CDs5 is a condition that it is possible to determine that the driver DR is not in the driving trouble state. The vehicle control apparatus 10 determines, based on the driver information ID, whether or not the driver DR is in the driving trouble state, after starting driving trouble tackling control.

Incidentally, the vehicle control apparatus 10 does not stop driving trouble tackling control if the stop holding request operator 58 or the shift lever 451 is operated when driving trouble tackling control is performed. It goes without saying, as described previously, that the vehicle control apparatus 10 stops neither lane keeping control nor follow-up running control in this case.

Concrete Behavior of Vehicle Control Apparatus

Next, the concrete behavior of the vehicle control apparatus 10 will be described. The CPU of the ECU 90 of the vehicle control apparatus 10 executes a routine shown in FIG. 16 on a predetermined computation cycle. Accordingly, upon arrival of a predetermined timing, the CPU starts a process from step 1600 of FIG. 16, and advances the process to step 1605 to determine whether or not the value of a lane keeping performance flag X1 is "0". The lane keeping performance flag X1 is a flag indicating whether or not lane keeping control is being performed. The value of this flag is set to "1" when lane keeping control is being performed, and is set to "0" when lane keeping control is not being performed.

If the result of the determination in step 1605 is "Yes" in step 1605, the CPU proceeds to step 1610 to determine whether or not the performance of lane keeping control has been requested.

Figure 17:
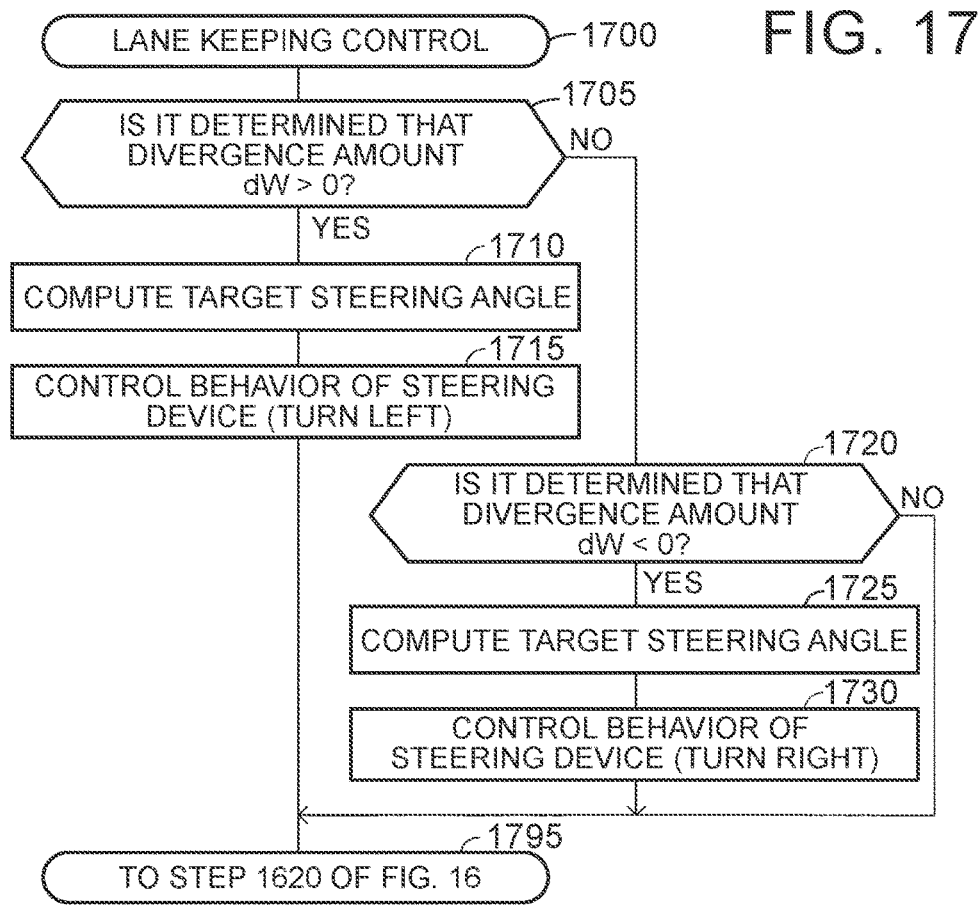
FIG. 17 is a flowchart showing another routine that is executed by the vehicle control apparatus according to the embodiment of the disclosure.

If the result of the determination in step 1610 is "Yes", the CPU advances the process to step 1615 to execute a routine shown in FIG. 17. Accordingly, upon advancing the process to step 1615, the CPU starts a process from step 1700 of FIG. 17, and advances the process to step 1705 to determine whether or not the divergence amount dW is larger than zero. In the present example, when the own vehicle centerline VC has veered to the right from the lane centerline LC, the divergence amount dW is larger than zero.

If the result of the determination in step 1705 is "Yes", the CPU advances the process to step 1710 to acquire, through computation, a steering angle θ for making the divergence amount dW equal to zero by turning the own vehicle 100 left, as a target steering angle θtgt. Subsequently, the CPU advances the process to step 1715 to control the behavior of the steering device 23 such that the target steering angle θtgt acquired in step 1710 is realized. Thus, the own vehicle 100 is steered in such a manner as to turn left.

Subsequently, the CPU passes through step 1795 and advances the process to step 1620 of FIG. 16 to set the value of the lane keeping performance flag X1 to "1". Subsequently, the CPU advances the process to step 1695 to end the present routine temporarily.

On the other hand, if the result of the determination in step 1705 of FIG. 17 is "No", the CPU advances the process to step 1720 to determine whether or not the divergence amount dW is smaller than zero. In the present example, when the own vehicle centerline VC has veered to the left from the lane centerline LC, the divergence amount dW is smaller than zero.

If the result of the determination in step 1720 is "Yes", the CPU advances the process to step 1725 to acquire, through computation, the steering angle θ for making the divergence amount dW equal to zero by turning the own vehicle 100 right, as the target steering angle θtgt. Subsequently, the CPU advances the process to step 1730 to control the behavior of the steering device 23 such that the target steering angle θtgt acquired in step 1725 is realized. Thus, the own vehicle 100 is steered in such a manner as to turn right.

Subsequently, the CPU passes through step 1795 and advances the process to step 1620 of FIG. 16 to set the value of the lane keeping performance flag X1 to "1". Subsequently, the CPU advances the process to step 1695 to end the present routine temporarily.

Figure 16:
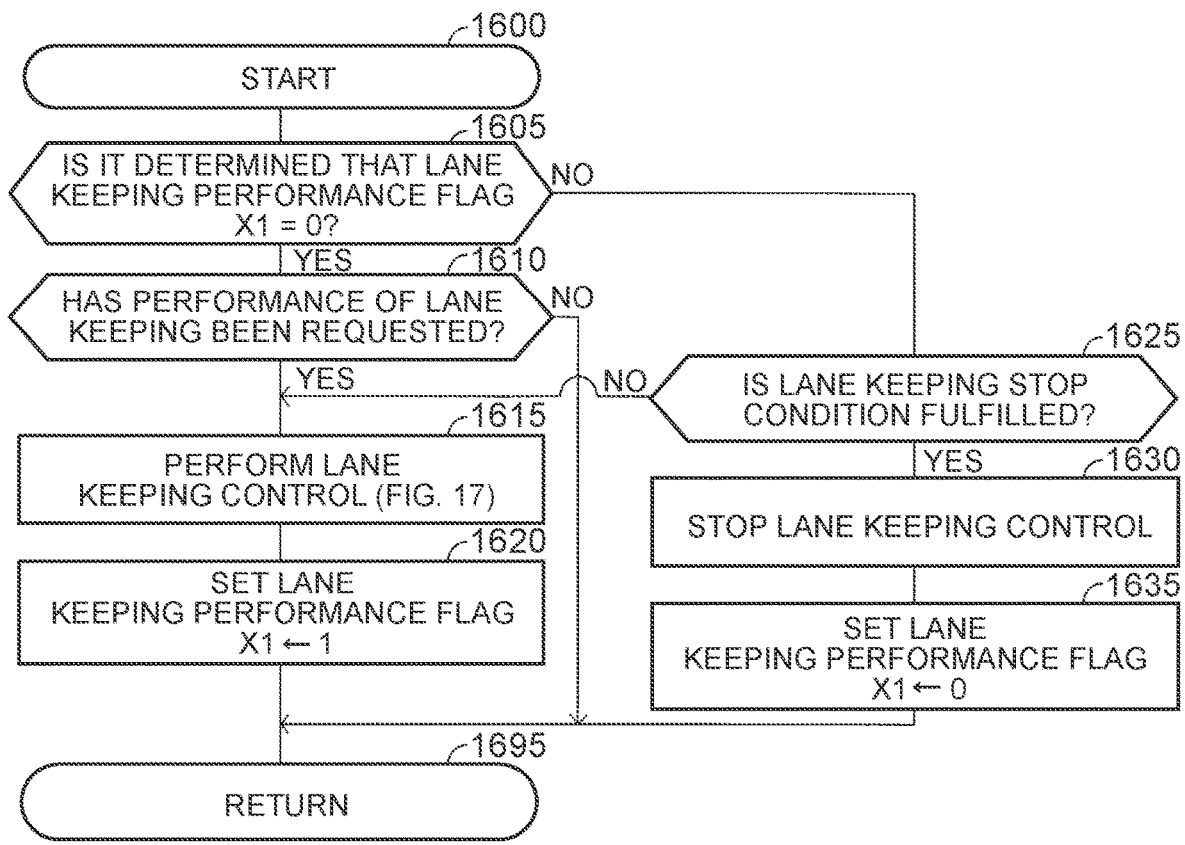
FIG. 16 is a flowchart showing a routine that is executed by the vehicle control apparatus according to the embodiment of the disclosure.

On the other hand, if the result of the determination in step 1720 of FIG. 17 is "No", the CPU passes through step 1795 and directly advances the process to step 1620 of FIG. 16 to set the value of the lane keeping performance flag X1 to "1". Subsequently, the CPU advances the process to step 1695 to end the present routine temporarily.

Besides, if the result of the determination in step 1610 of FIG. 16 is "No", the CPU directly advances the process to step 1695 to end the present routine temporarily.

Besides, if the result of the determination in step 1605 is "No", the CPU advances the process to step 1625 to determine whether or not one of the first to fourth lane keeping stop conditions CLs1 to CLs4 is fulfilled.

If the result of the determination in step 1625 is "Yes", the CPU advances the process to step 1630 to stop lane keeping control. Subsequently, the CPU advances the process to step 1635 to set the value of the lane keeping performance flag X1 to "0".

Subsequently, the CPU advances the process to step 1695 to end the present routine temporarily.

On the other hand, if the result of the determination in step 1625 is "No", the CPU advances the process to step 1615 to execute the routine shown in FIG. 17 as described previously. Subsequently, the CPU advances the process to step 1620 to set the lane keeping performance flag X1 to "1". Subsequently, the CPU advances the process to step 1695 to end the present routine temporarily.

Figure 18:
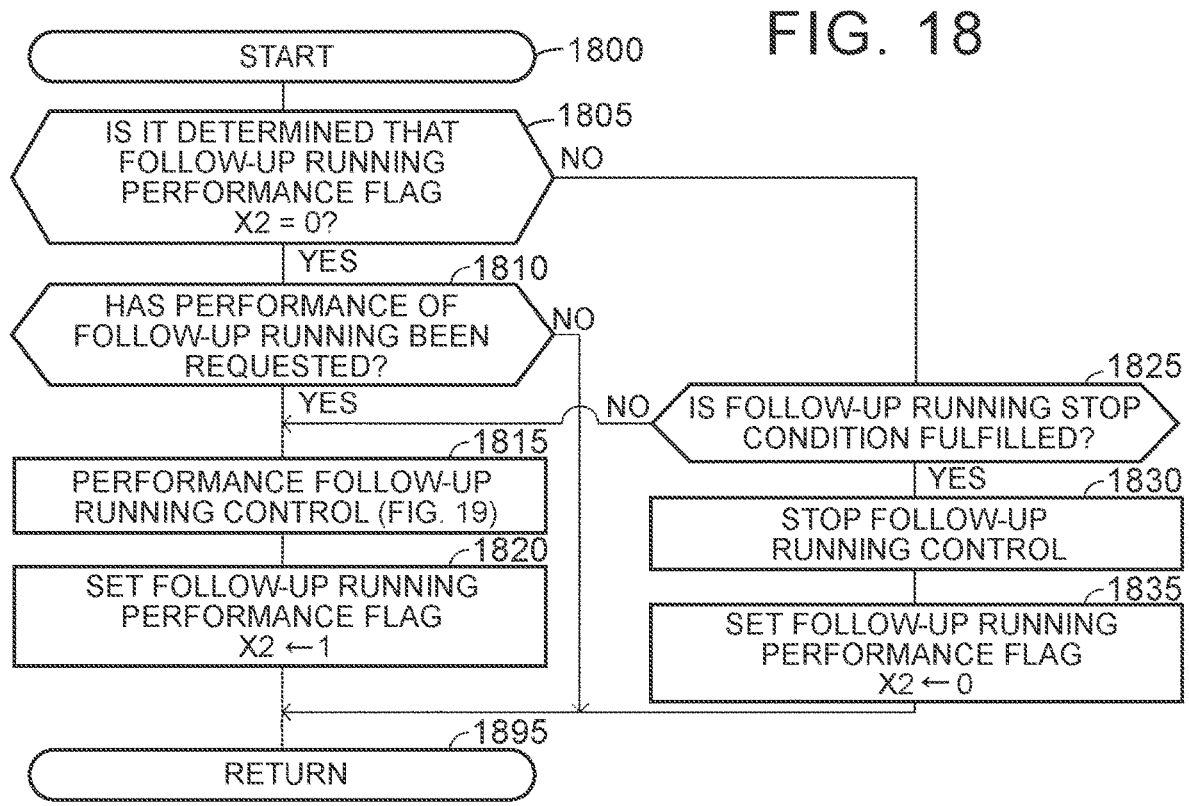
FIG. 18 is a flowchart showing still another routine that is executed by the vehicle control apparatus according to the embodiment of the disclosure.

Furthermore, the CPU is designed to execute a routine shown in FIG. 18 on a predetermined computation cycle. Accordingly, upon arrival of a predetermined timing, the CPU starts a process from step 1800 of FIG. 18, and advances the process to step 1805 to determine whether or not the value of a follow-up running performance flag X2 is "0". The follow-up running performance flag X2 is a flag indicating whether or not follow-up running control is being performed. The value of this flag is set to "1" when follow-up running control is being performed, and is set to "0" when follow-up running control is not being performed.

If the result of the determination in step 1805 is "Yes", the CPU advances the process to step 1810 to determine whether or not the performance of follow-up running control has been requested.

Figure 19:
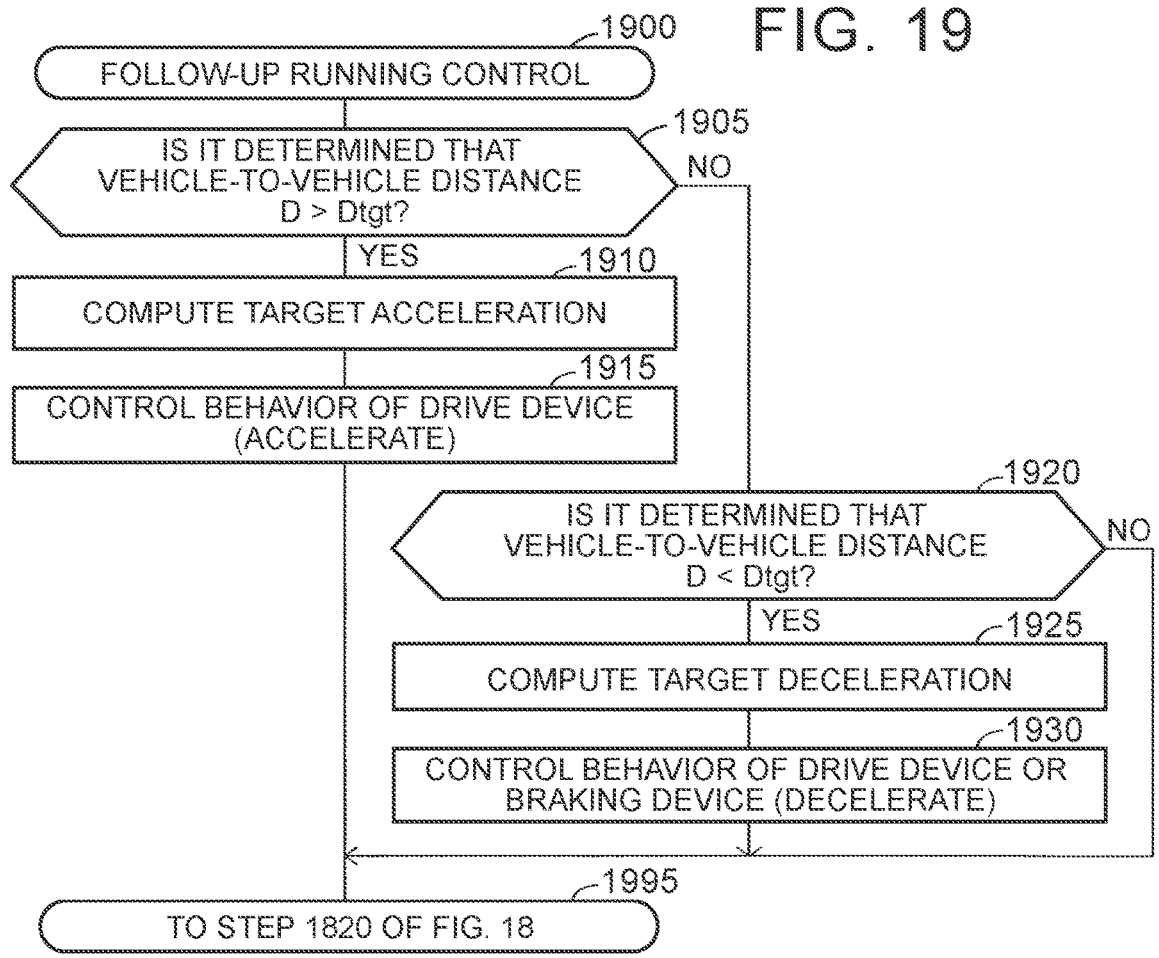
FIG. 19 is a flowchart showing still another routine that is executed by the vehicle control apparatus according to the embodiment of the disclosure.

If the result of the determination in step 1810 is "Yes", the CPU advances the process to step 1815 to execute a routine shown in FIG. 19. Accordingly, upon advancing the process to step 1815, the CPU starts a process from step 1900 of FIG. 19, and advances the process to step 1905 to determine whether or not the vehicle-to-vehicle distance D is longer than the target vehicle-to-vehicle distance Dtgt.

If the result of the determination in step 1905 is "Yes", the CPU advances the process to step 1910 to acquire, through computation, an acceleration GA of the own vehicle 100 for making the vehicle-to-vehicle distance D coincident with the target vehicle-to-vehicle distance Dtgt by raising the own vehicle speed V100, as a target acceleration GAtgt. Subsequently, the CPU advances the process to step 1915 to control the behavior of the drive device 21 such that the target acceleration GAtgt acquired in step 1910 is realized. Thus, the own vehicle 100 is accelerated.

Subsequently, the CPU passes through step 1995 and advances the process to step 1820 of FIG. 18 to set the value of the follow-up running performance flag X2 to "1". Subsequently, the CPU advances the process to step 1895 to end the present routine temporarily.

On the other hand, if the result of the determination in step 1905 of FIG. 19 is "No", the CPU advances the process to step 1920 to determine whether or not the vehicle-to-vehicle distance D is shorter than the target vehicle-to-vehicle distance Dtgt.

If the result of the determination in step 1920 is "Yes", the CPU advances the process to step 1925 to acquire, through computation, a deceleration GD of the own vehicle 100 for making the vehicle-to-vehicle distance D coincident with the target vehicle-to-vehicle distance Dtgt by lowering the own vehicle speed V100, as a target deceleration GDtgt. Subsequently, the CPU advances the process to step 1930 to control the behavior of the drive device 21 or the braking device 22 such that the target deceleration GDtgt acquired in step 1925 is realized. Thus, the own vehicle 100 is decelerated.

Subsequently, the CPU passes through step 1995, and advances the process to step 1820 of FIG. 18 to set the value of the follow-up running performance flag X2 to "1". Subsequently, the CPU advances the process to step 1895 to end the present routine temporarily.

On the other hand, if the result of the determination in step 1920 of FIG. 19 is "No", the CPU passes through step 1995, and directly advances the process to step 1820 of FIG. 18 to set the value of the follow-up running performance flag X2 to "1". Subsequently, the CPU advances the process to step 1895 to end the present routine temporarily.

Besides, if the result of the determination in step 1810 of FIG. 18 is "No", the CPU directly advances the process to step 1895 to end the present routine temporarily.

Besides, if the result of the determination in step 1805 is "No", the CPU advances the process to step 1825 to determine whether or not one of the first to fifth follow-up running stop conditions CAs1 to CABS has been fulfilled.

If the result of the determination in step 1825 is "Yes", the CPU advances the process to step 1830 to stop follow-up running control. Subsequently, the CPU advances the process to step 1835 to set the value of the follow-up running performance flag X2 to "0". Subsequently, the CPU advances the process to step 1895 to end the present routine temporarily.

On the other hand, if the result of the determination in step 1825 is "No", the CPU advances the process to step 1815 to execute the routine shown in FIG. 19 as described previously. Subsequently, the CPU advances the process to step 1820 to set the value of the follow-up running performance flag X2 to "1". Subsequently, the CPU advances the process to step 1895 to end the present routine temporarily.

Figure 20:
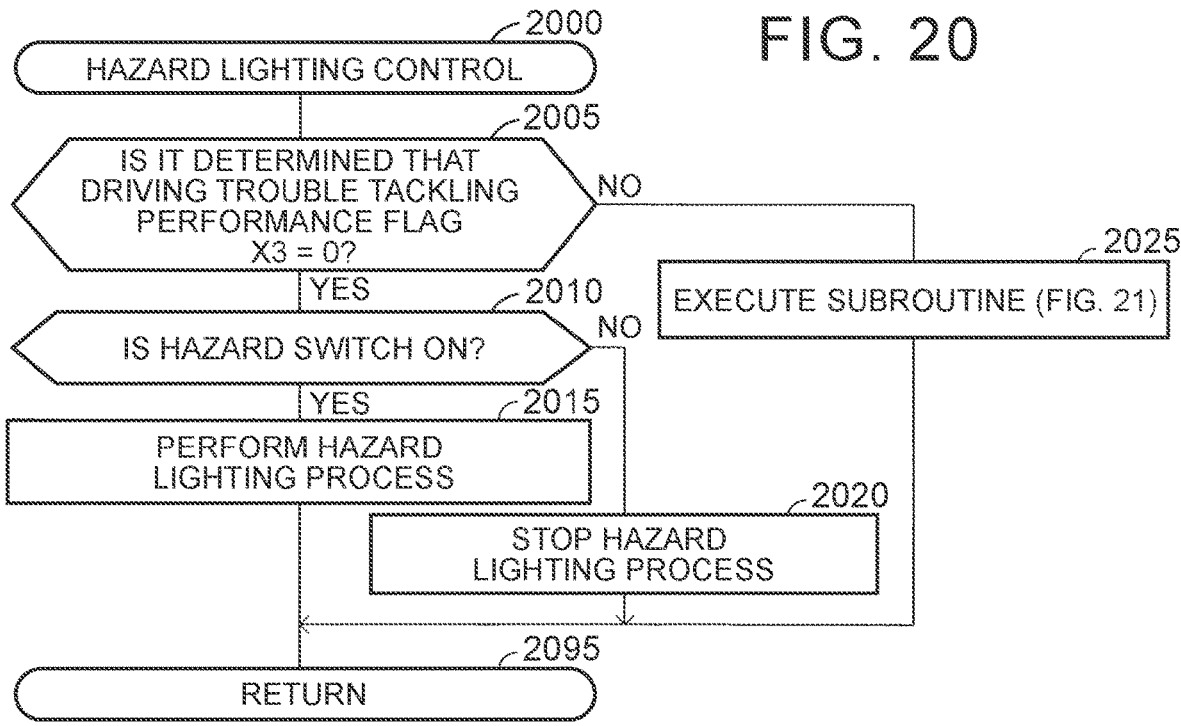
FIG. 20 is a flowchart showing still another routine that is executed by the vehicle control apparatus according to the embodiment of the disclosure.

Furthermore, the CPU is designed to execute a routine shown in FIG. 20 on a predetermined cycle. Accordingly, upon arrival of a predetermined timing, the CPU starts a process from step 2005 of FIG. 20, and advances the process to step 2005 to determine whether or not the value of a driving trouble tackling performance flag X3 is "0". The driving trouble tackling performance flag X3 is a flag indicating whether or not driving trouble tackling control is being performed. The value of this flag is set to "1" when driving trouble tackling control is being performed, and is set to "0" when driving trouble tackling control is not being performed.

If the result of the determination in step 2005 is "Yes" in step 2005, the CPU advances the process to step 2010 to determine whether or not the hazard switch 56 has been operated to be set at the ON position.

If the result of the determination in step 2010 is "Yes", the CPU advances the process to step 2015 to perform the hazard lighting process. Subsequently, the CPU advances the process to step 2095 to end the present routine temporarily.

On the other hand, if the result of the determination in step 2010 is "No", the CPU advances the process to step 2020 to stop the hazard lighting process. Subsequently, the CPU advances the process to step 2095 to end the present routine temporarily.

Figure 21:
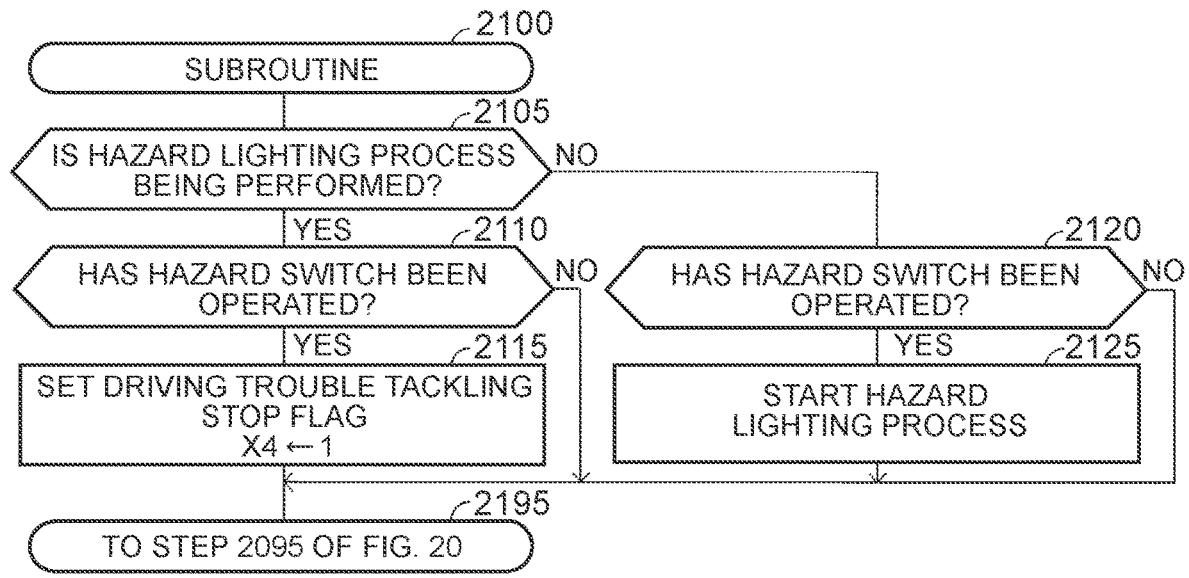
FIG. 21 is a flowchart showing still another routine that is executed by the vehicle control apparatus according to the embodiment of the disclosure.

Besides, if the result of the determination in step 2005 is "No", the CPU advances the process to step 2025 to execute a routine shown in FIG. 21. Accordingly, upon advancing the process to step 2025, the CPU starts a process from step 2100 of FIG. 21, and advances the process to step 2105 to determine whether or not the hazard lighting process is being performed.

If the result of the determination in step 2105 is "Yes", the CPU advances the process to step 2110 to determine whether or not the hazard switch 56 has been operated.

If the result of the determination in step 2110 is "Yes", the CPU advances the process to step 2115 to set the value of a driving trouble tackling stop flag X4 to "1". The driving trouble tackling stop flag X4 is a flag indicating whether or not the stop of driving trouble tackling control has been requested. The value of this flag is set to "1" when the stop of driving trouble tackling control is requested, and is set to "0" when driving trouble tackling control is stopped. Accordingly, through the setting of the value of the driving trouble tackling stop flag X4 to "1" in step 2115, the result of the determination in step 2230 of FIG. 22 that will be described later becomes "Yes", and driving trouble tackling control is stopped in step 2235.

After performing the processing of step 2115 of FIG. 21, the CPU passes through step 2195, and advances the process to step 2095 of FIG. 20 to end the present routine temporarily.

On the other hand, if the result of the determination in step 2110 is "No", the CPU passes through step 2195, and directly advances the process to step 2095 of FIG. 20 to end the present routine temporarily.

Besides, if the result of the determination in step 2105 is "No", the CPU advances the process to step 2120 to determine whether or not the hazard switch 56 has been operated (e.g., whether or not the hazard switch 56 has been operated to be set at the ON position).

If the result of the determination in step 2120 is "Yes", the CPU advances the process to step 2125 to start the hazard lighting process. Subsequently, the CPU passes through step 2195, and advances the process to step 2095 of FIG. 20 to end the present routine temporarily.

On the other hand, if the result of the determination in step 2120 is "No", the CPU passes through step 2195, and directly advances the process to step 2095 of FIG. 20 to end the present routine temporarily.

Figure 22:
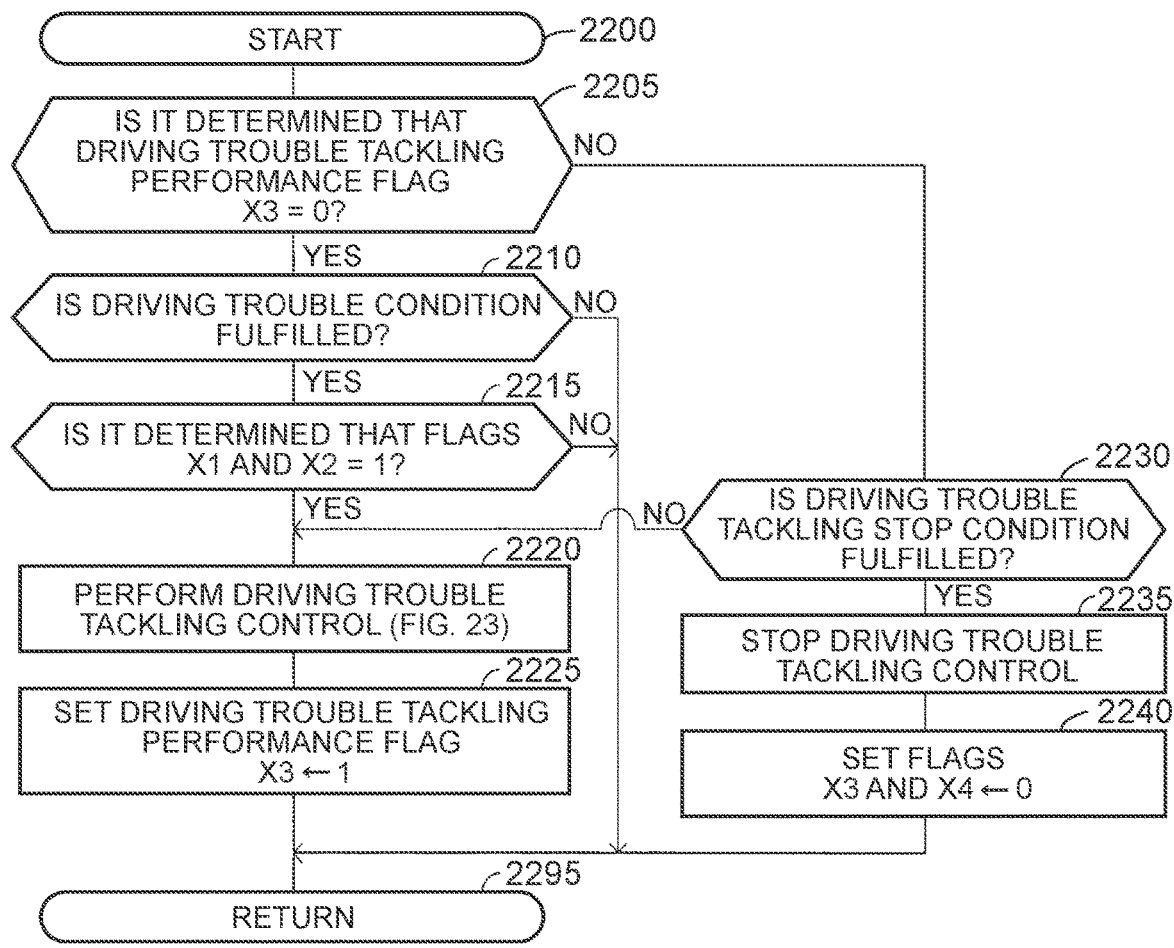
FIG. 22 is a flowchart showing still another routine that is executed by the vehicle control apparatus according to the embodiment of the disclosure.

Furthermore, the CPU is designed to execute a routine shown in FIG. 22 on a predetermined cycle. Accordingly, upon arrival of the timing of a process, the CPU starts the process from step 2200 of FIG. 22, and advances the process to step 2205 to determine whether or not the value of the driving trouble tackling performance flag X3 is "0".

If the result of the determination in step 2205 is "Yes", the CPU advances the process to step 2210 to determine whether or not the driving trouble condition CD is fulfilled.

If the result of the determination in step 2210 is "Yes", the CPU advances the process to step 2215 to determine whether or not the values of the lane keeping performance flag X1 and the follow-up running performance flag X2 are "1".

Figure 23:
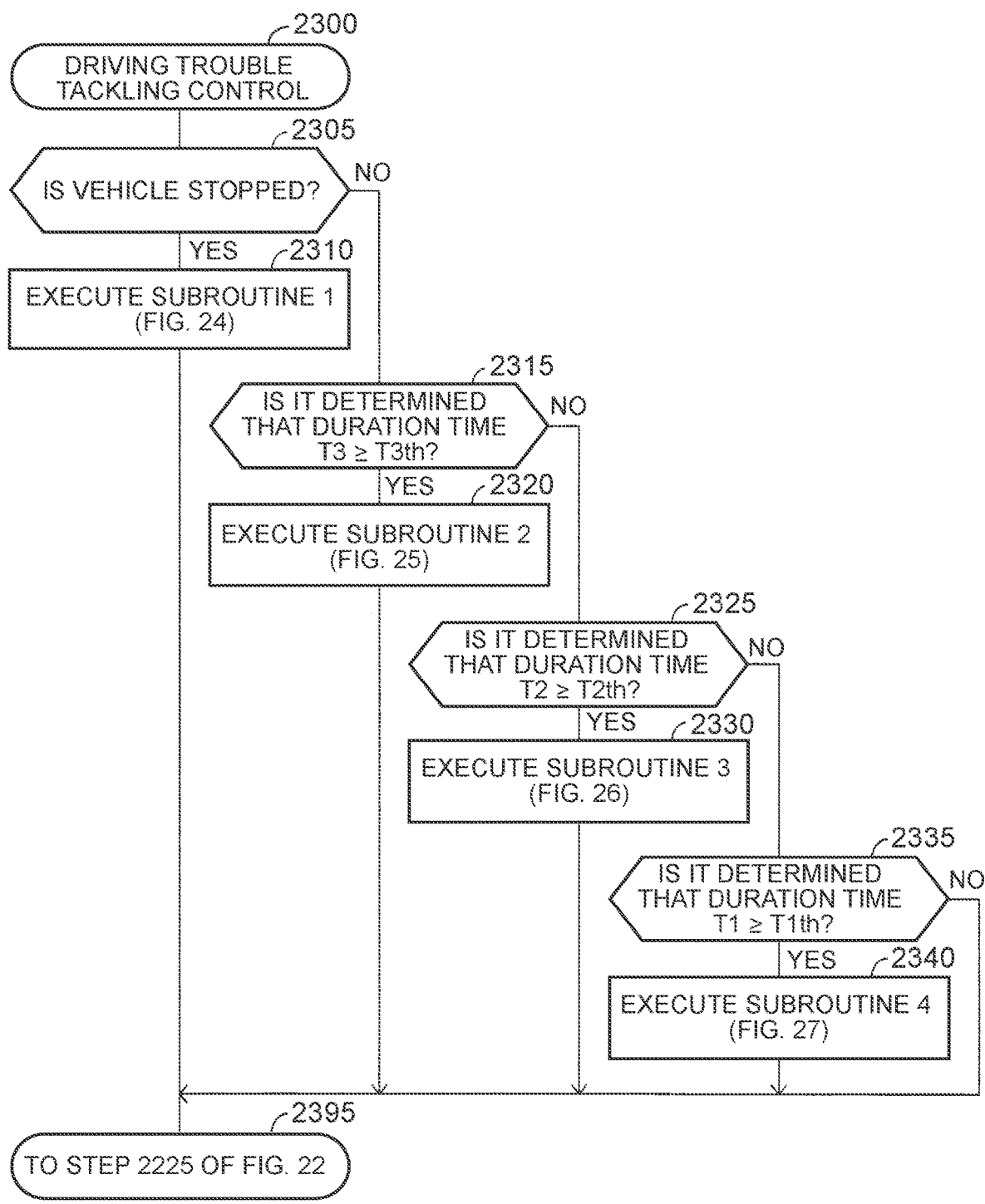
FIG. 23 is a flowchart showing still another routine that is executed by the vehicle control apparatus according to the embodiment of the disclosure.

If the result of the determination in step 2215 is "Yes", the CPU advances the process to step 2220 to execute a routine shown in FIG. 23. Accordingly, upon advancing the process to step 2220, the CPU starts a process from step 2300 of FIG. 23, and advances the process to step 2305 to determine whether or not the own vehicle 100 has been stopped.

Figure 24:
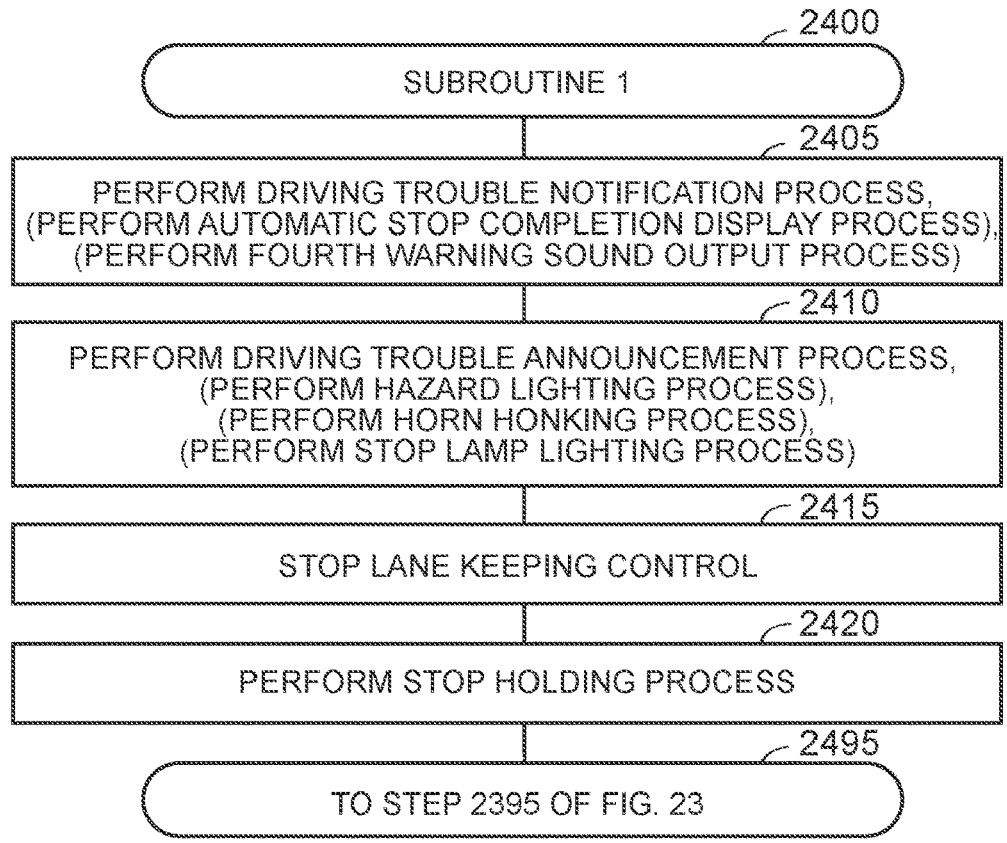
FIG. 24 is a flowchart showing still another routine that is executed by the vehicle control apparatus according to the embodiment of the disclosure.

If the result of the determination in step 2305 is "Yes" in step 2305, the CPU advances the process to step 2310 to execute a routine shown in FIG. 24. Accordingly, upon advancing the process to step 2310, the CPU starts a process from step 2400 of FIG. 24, and advances the process to step 2405 to perform the driving trouble notification process. In concrete terms, the CPU performs the automatic stop completion display process and the fourth warning sound output process as the driving trouble notification process.

Subsequently, the CPU advances the process to step 2410 to perform the driving trouble announcement process. In concrete terms, the CPU performs the hazard lighting process, the horn honking process, and the stop lamp lighting process as the driving trouble announcement process.

Subsequently, the CPU advances the process to step 2415 to stop lane keeping control. Subsequently, the CPU advances the process to step 2420 to perform the stop holding process.

Subsequently, the CPU passes through step 2495 and step 2395 of FIG. 23, and advances the process to step 2225 of FIG. 22 to set the value of the driving trouble tackling performance flag X3 to "1". Subsequently, the CPU advances the process to step 2295 to end the present routine temporarily.

On the other hand, if the result of the determination in step 2305 of FIG. 23 is "No", the CPU advances the process to step 2315 to determine whether or not the third duration time T3 has become equal to or longer than the third determination time T3th.

Figure 25:
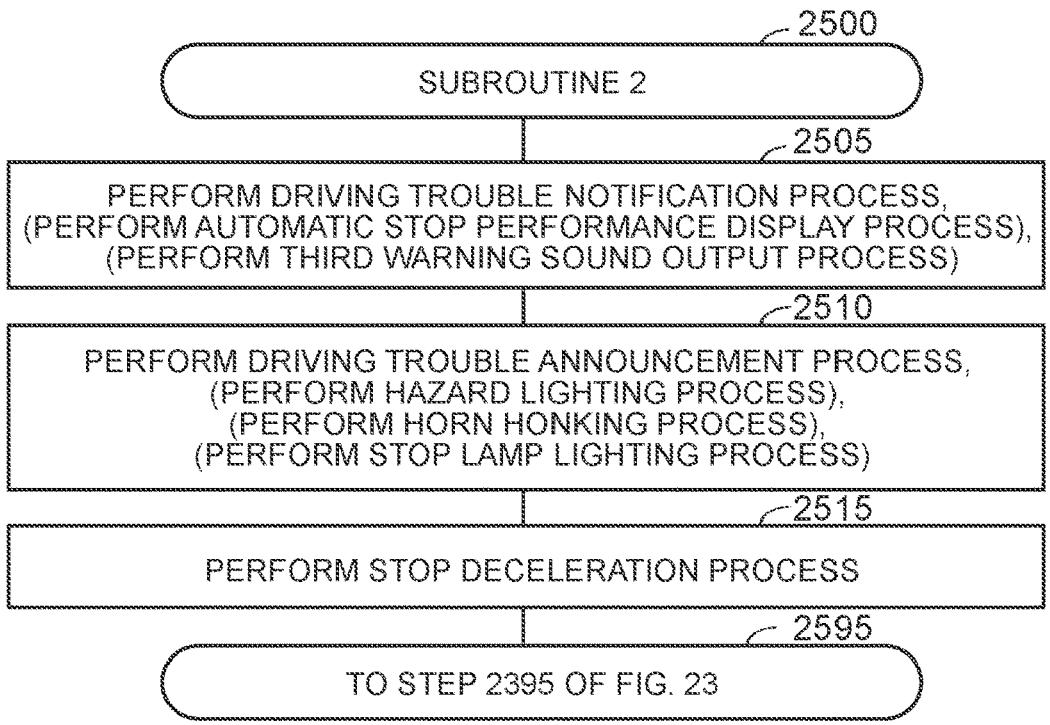
FIG. 25 is a flowchart showing still another routine that is executed by the vehicle control apparatus according to the embodiment of the disclosure.

If the result of the determination in step 2315 is "Yes", the CPU advances the process to step 2320 to execute a routine shown in FIG. 25. Accordingly, upon advancing the process to step 2320, the CPU starts a process from step 2500 of FIG. 25, and advances the process to step 2505 to perform the automatic stop performance display process and the third warning sound output process as the driving trouble notification process. Subsequently, the CPU advances the process to step 2510 to perform the hazard lighting process, the horn honking process, and the stop lamp lighting process as the driving trouble announcement process.

Subsequently, the CPU advances the process to step 2515 to perform the stop deceleration process.

Subsequently, the CPU passes through step 2595 and step 2395 of FIG. 23, and advances the process to step 2225 of FIG. 22 to set the value of the driving trouble tackling performance flag X3 to "1". Subsequently, the CPU advances the process to step 2295 to end the present routine temporarily.

On the other hand, if the result of the determination in step 2315 is "No", the CPU advances the process to step 2325 to determine whether or not the second duration time T2 has become equal to or longer than the second determination time T2th.

If the result of the determination in step 2325 is "Yes", the CPU advances the process to step 2330 to execute a routine shown in FIG. 26. Accordingly, upon advancing the process to step 2330, the CPU starts a process from step 2600 of FIG. 26, and advances the process to step 2605 to perform the steering wheel holding request display process, the automatic stop notice display process, and the second warning sound output process as the driving trouble notification process. Subsequently, the CPU advances the process to step 2610 to perform the hazard lighting process, the horn honking process, and the stop lamp lighting process as the driving trouble announcement process.

Subsequently, the CPU advances the process to step 2615 to perform the gentle deceleration process as the deceleration process.

Subsequently, the CPU passes through step 2695 and step 2395 of FIG. 23, and advances the process to step 2225 of FIG. 22 to set the value of the driving trouble tackling performance flag X3 to "1". Subsequently, the CPU advances the process to step 2295 to end the present routine temporarily.

On the other hand, if the result of the determination in step 2325 is "No", the CPU advances the process to step 2335 to determine whether or not the first duration time T1 has become equal to or longer than the first determination time T1th.

If the result of the determination in step 2335 is "Yes", the CPU advances the process to step 2340 to execute a routine shown in FIG. 27. Accordingly, upon advancing the process to step 2340, the CPU starts a process from step 2700 of FIG. 27, and advances the process to step 2705 to perform the steering wheel holding request display process and the first warning sound output process as the driving trouble notification process.

Subsequently, the CPU passes through step 2795 and step 2395 of FIG. 23, and advances the process to step 2225 of FIG. 22 to set the value of the driving trouble tackling performance flag X3 to "1". Subsequently, the CPU advances the process to step 2295 to end the present routine temporarily.

On the other hand, if the result of the determination in step 2335 of FIG. 23 is "No", the CPU passes through step 2395 of FIG. 23, and directly advances the process to step 2225 of FIG. 22 to set the value of the driving trouble tackling performance flag X3 to "1". Subsequently, the CPU advances the process to step 2295 to end the present routine temporarily.

Besides, if the result of the determination in step 2210 or step 2215 of FIG. 22 is "No", the CPU directly advances the process to step 2295 to end the present routine temporarily.

Besides, if the result of the determination in step 2205 of FIG. 22 is "No", the CPU advances the process to step 2230 to determine whether or not the driving trouble tackling stop condition is fulfilled. In the present example, as this determination, the CPU determines whether or not the value of the driving trouble tackling stop flag X4 is "1", and determines whether or not one of the first to fifth driving trouble tackling stop conditions CDs' to CDs5 is fulfilled.

If the result of the determination in step 2230 is "Yes", the CPU advances the process to step 2235 to stop driving trouble tackling control. Subsequently, the CPU advances the process to step 2240 to set the values of the driving trouble tackling performance flag X3 and the driving trouble tackling stop flag X4 to "0". Subsequently, the CPU advances the process to step 2295 to end the present routine temporarily.

On the other hand, if the result of the determination in step 2230 is "No", the CPU advances the process to step 2220 to execute the routine shown in FIG. 23 as described previously. Subsequently, the CPU advances the process to step 2225 to set the value of the driving trouble tackling performance flag X3 to "1". Subsequently, the CPU advances the process to step 2295 to end the present routine temporarily.

The foregoing is the concrete behavior of the vehicle control apparatus 10.

Incidentally, the disclosure is not limited to the aforementioned embodiment, and various modification examples can be adopted within the scope of the disclosure.

As described above, the vehicle control apparatus 10 is configured to stop driving trouble tackling control when the hazard switch 56 is operated after the start of the hazard lighting process of driving trouble tackling control. In addition, however, the vehicle control apparatus 10 may be configured to stop driving trouble tackling control when the hazard switch 56 is set in an ON state as well, in the case where the hazard switch 56 is operated before the start of the hazard lighting process of driving trouble tackling control.

What is claimed is:

1. A vehicle control apparatus comprising:
   a memory storing one or more instructions;
   a processor operatively coupled to the memory and configured to execute the one or more instructions stored in the memory,
   wherein the one or more instructions, when executed by the processor, cause the vehicle control apparatus to:
   start driving trouble tackling control that is configured to (i) decelerate and stop a vehicle based on determining that a driver of the vehicle is in a driving trouble state where the driver has trouble driving the vehicle, (ii) start a deceleration process that is configured to decelerate the vehicle at a first predetermined timing as a first process of the driving trouble tackling control, and (iii) start a hazard lighting process that is configured to turn on one or more hazard lights at a second predetermined timing as a second process of the driving trouble tackling control,
   stop the driving trouble tackling control based on determining that a hazard switch that is operated to request start and stop of the hazard lighting is operated during performance of the hazard lighting process as the second pr cess of the driving trouble tackling control, and
   after execution of the driving trouble tackling control has started, turn on the one or more hazard lights without stopping the driving trouble tackling control based on determining that the hazard switch is operated between a timing in which it is determined that the driver is in the driving trouble state and the second predetermined timing in which the hazard lighting process is performed as the second process of the driving trouble tackling control.

2. The vehicle control apparatus according to claim 1, wherein the one or more instructions, when executed by the processor, further cause the vehicle control apparatus to: after starting turning on the one or more hazard lights by operating the hazard switch between the timing in which it is determined that (i) the driver is in the driving trouble state and (ii) the second predetermined timing in which the hazard lighting process is performed as the second process of the driving trouble tackling control, stop the driving trouble tackling control based on determining that the hazard switch is operated.

3. A vehicle control apparatus comprising:
   a memory storing one or more instructions;
   a processor operatively coupled to the memory and configured to execute the one or more instructions stored in the memory,
   wherein the one or more instructions, when executed by the processor, cause the vehicle control apparatus to:
   start driving trouble tackling control that is configured to (i) decelerate and stop a vehicle based on determining that a driver of the vehicle is in a driving trouble state where the driver has trouble driving the vehicle, (ii) start a deceleration process that is configured to decelerate the vehicle as a first process of the driving trouble tackling control, and (iii) start a hazard lighting process that is configured to turn on one or more hazard lights at a predetermined timing as a second process of the driving trouble tackling control,
   stop the driving trouble tackling control based on determining that a hazard switch that is operated to request turning on and turning off the one or more hazard lights is operated during performance of the hazard lighting process as the second process of the driving trouble tackling control, and
   after execution of the driving trouble tackling control has started, turn on the one or more hazard lights, without stopping the driving trouble tackling control based on determining that the hazard switch is operated between a timing in which it is determined that the driver is in the driving trouble state and the predetermined timing in which the hazard lighting process is performed as the second process of the driving trouble tackling control.

4. The vehicle control apparatus according to claim 3, wherein the one or more instructions, when executed by the processor, further cause the vehicle control apparatus to:
   after execution of the driving trouble tackling control has started, start the deceleration process after starting the hazard lighting process.

5. The vehicle control apparatus according to claim 3, wherein the one or more instructions, when executed by the processor, further cause the vehicle control apparatus to:
   after execution of the driving trouble tackling control has started. start the deceleration process and the hazard lighting process simultaneously.

6. The vehicle control apparatus according to claim 3, wherein the one or more instructions, when executed by the processor, further cause the vehicle control apparatus to:
   after starting turning on the one or more hazard lights by operating the hazard switch between the timing in which it is determined that (i) the driver is in the driving trouble state and (ii) the predetermined timing in which the hazard lighting process is performed as the second process of the driving trouble tackling control, stop the driving trouble tackling control based on determining that the hazard switch is operated.

* * * * *